United States Patent
White et al.

(10) Patent No.: US 11,055,354 B2
(45) Date of Patent: Jul. 6, 2021

(54) OMNI-PLATFORM QUESTION ANSWERING SYSTEM

(71) Applicant: salesforce.com, inc., San Francisco, CA (US)

(72) Inventors: Peter Francis White, San Francisco, CA (US); Michael Micucci, San Francisco, CA (US); Scott Douglas White, San Francisco, CA (US); Weiping Peng, San Francisco, CA (US); Anjan Goswami, San Francisco, CA (US); Pranav Suresh Shah, San Francisco, CA (US); Prakash Mallick, Fremont, CA (US); Pingping Xiu, San Francisco, CA (US); Zhenhua Xu, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 136 days.

(21) Appl. No.: 15/803,698

(22) Filed: Nov. 3, 2017

(65) Prior Publication Data
US 2019/0138660 A1    May 9, 2019

(51) Int. Cl.
*G06F 16/90*    (2019.01)
*G06F 16/9032*    (2019.01)
(Continued)

(52) U.S. Cl.
CPC .... *G06F 16/90332* (2019.01); *G06F 16/3329* (2019.01); *G06F 16/9038* (2019.01); *G06F 16/9535* (2019.01)

(58) Field of Classification Search
CPC .................................................. G06F 16/3329
See application file for complete search history.

(56) References Cited

U.S. PATENT DOCUMENTS

| 10,019,457 B1* | 7/2018 | Stefani ................ H03M 7/3059 |
| 2011/0022583 A1* | 1/2011 | Pennell, Sr. ...... G06F 16/24542 |
| | | 707/718 |

(Continued)

OTHER PUBLICATIONS

IRS/EP, International Search Report and Written Opinion of the International Searching Authority, Int'l Appl. No. PCT/US2018/056313, dated Dec. 7, 2018, European Patent Office, Rijswijk, The Netherlands, 15pgs.

*Primary Examiner* — Mohammad S Rostami
(74) *Attorney, Agent, or Firm* — Holland & Hart LLP

(57) ABSTRACT

Methods, systems, and devices for processing and answering a natural language query at a database server are described. An end user may submit a question in natural language over a communication platform. An answer engine running on the database server may receive the question, and may process the content of the question using natural language processing (NLP) techniques. The answer engine may construct a search query based on the NLP, and may retrieve a set of documents from a database using the search query. The answer engine may rank the documents, prune the number of documents, modify the documents for the given communication platform, or perform any combination of these functions. In some cases, an intermediate user may review the documents, and may select one or more documents for publication. The answer engine may send the selected documents to the end user as answers in response to the question.

20 Claims, 13 Drawing Sheets

(51) Int. Cl.
*G06F 16/332* (2019.01)
*G06F 16/9038* (2019.01)
*G06F 16/9535* (2019.01)

(56) References Cited

U.S. PATENT DOCUMENTS

| | | | | |
|---|---|---|---|---|
| 2011/0113062 A1* | 5/2011 | Quinlan | G06F 16/951 | 707/770 |
| 2011/0119254 A1* | 5/2011 | Brown | G06F 16/36 | 707/722 |
| 2012/0078888 A1* | 3/2012 | Brown | G06F 16/3329 | 707/723 |
| 2012/0084293 A1* | 4/2012 | Brown | G06F 16/2455 | 707/741 |
| 2012/0254143 A1* | 10/2012 | Varma | G06F 16/243 | 707/706 |
| 2014/0006012 A1* | 1/2014 | Zhou | G06F 16/3329 | 704/9 |
| 2016/0019220 A1* | 1/2016 | Jamrog | G06F 17/271 | 707/768 |
| 2016/0085827 A1* | 3/2016 | Chadha | G06F 16/2462 | 707/776 |
| 2016/0132553 A1* | 5/2016 | Seo | G06F 16/90335 | 726/28 |
| 2016/0179945 A1* | 6/2016 | Lastra Diaz | G06F 16/367 | 707/739 |
| 2016/0328467 A1* | 11/2016 | Zou | G06F 17/2735 | |
| 2016/0350406 A1* | 12/2016 | Byron | G06F 16/3329 | |
| 2017/0169101 A1* | 6/2017 | Walia | G06Q 30/016 | |
| 2018/0075368 A1* | 3/2018 | Brennan | G06F 16/35 | |
| 2018/0101601 A1* | 4/2018 | Brown | G06F 16/3329 | |
| 2018/0143978 A1* | 5/2018 | Chang | B60N 2/2806 | |
| 2018/0240038 A1* | 8/2018 | Adibowo | G06F 16/24578 | |
| 2018/0336528 A1* | 11/2018 | Carpenter | G06F 16/3334 | |

* cited by examiner

— OMNI-PLATFORM QUESTION ANSWERING SYSTEM —

FIELD OF TECHNOLOGY

The present disclosure relates generally to database systems and data processing, and more specifically to an omni-platform question answering system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platforms, a user may submit questions to a community of users in various ways (e.g., using various communication platforms, such as service modules, email, support websites, etc.). These questions may be formatted in plain language. It may be inefficient and time consuming for the user to wait for an answer from an administrative user or an "expert" user in response to the question. Additionally, these administrative or expert users may have to check multiple communication platforms in order to view the question. In addition, systems for receiving such questions may be configured for a single platform or may have separate configurations for each platform. Such limitations may increase the complexity of formulating answers to the submitted questions as well as limit the functionality of responding to the questions.

DETAILED DESCRIPTION

Figure 1:
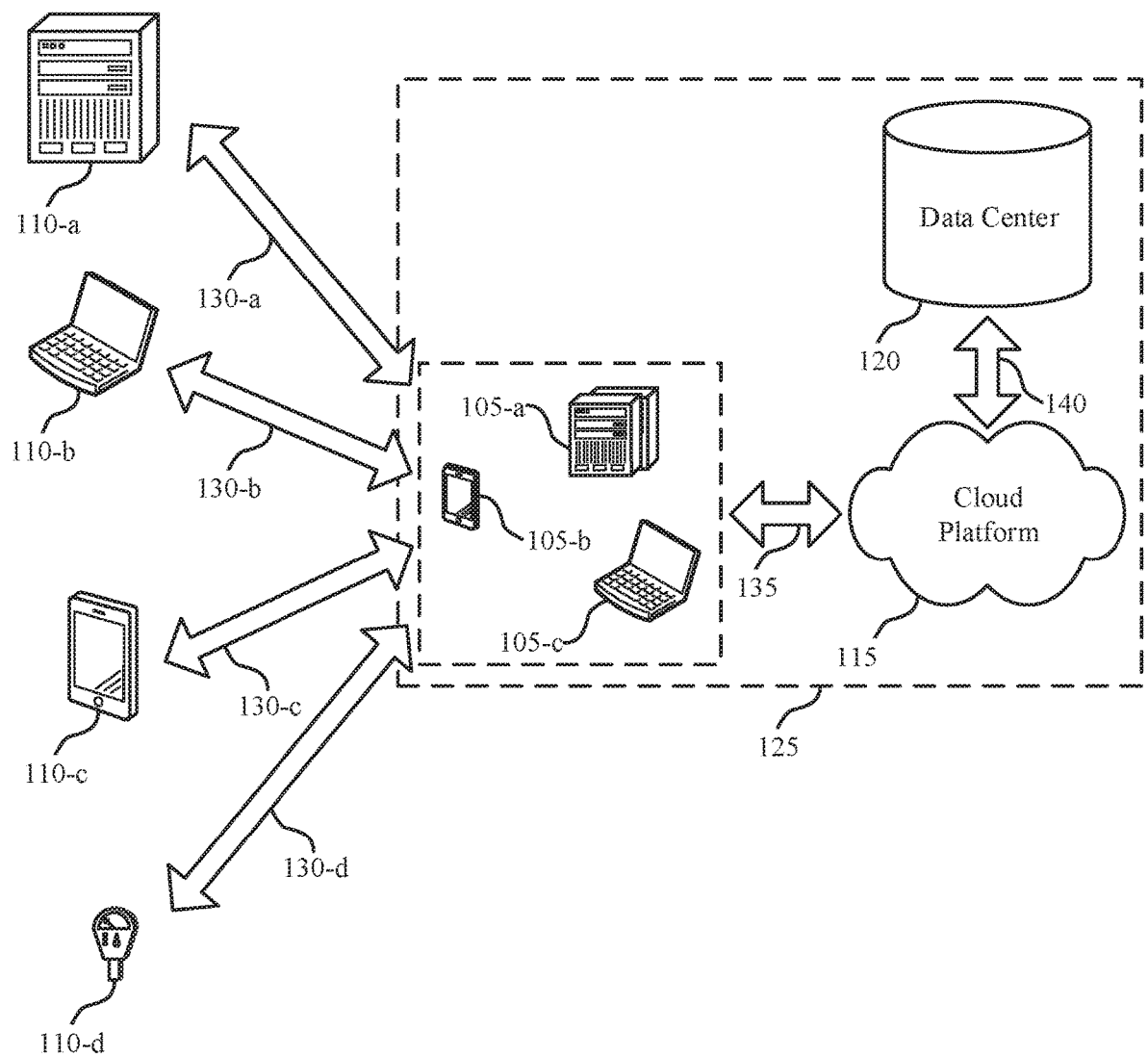
FIG. 1 illustrates an example of a system for natural language query processing at a database server that supports an omni-platform question answering system in accordance with aspects of the present disclosure.

In some database systems, one or more servers or server clusters may host an answer engine supporting efficient and accurate question-answering services for one or more communities of users. A user, referred to as an end user and operating a user device, may submit questions in plain language using a communication platform of a set of possible communication platforms. The possible communication platforms may include email, text messages, service modules, chat bots, forum posts, or any other question submission applications. The question may pass through an application programming interface (API) to the answer engine for processing.

The answer engine may process the question as a natural language query using a multi-layer approach. In a first layer, the answer engine may process the content of the natural language query (e.g., using natural language processing (NLP) and other features or algorithms), and may extract information from the query. The answer engine may generate a search query based on the extracted information, which may be an example of a multi-level query. The answer engine may send one or more queries to a search service in order to retrieve a set of documents from a database. In some cases, the search query may specify a number of documents, n, to fetch from the database. These documents may include different types of documents, such as articles and previous question/answer posts.

The answer engine may receive a set of documents, separated into subsets corresponding to the different types of documents. In a second layer, the answer engine may rank the retrieved documents using a ranking model, where the ranking is based on a comparison of the documents and the question. This ranking model may implement a number of features, including NLP, container level features, behavioral features, or any number of other features for analyzing the accuracy of the documents. In this layer, the documents of different types may be ranked separately. A third layer may merge the ranked documents of different types into a single list of ranked documents. In some cases, the answer engine may perform additional pruning on this list of ranked documents. Once the answer engine has determined the documents most likely to answer the question, the answer engine may send the document in response. In some cases, one or more intermediate users may review the determined documents, and may select the documents to publish to the end users. The end users and the intermediate users may provide feedback to the answer engine based on the documents included in the response, and the answer engine may perform model evaluations and modifications based on the user feedback.

Aspects of the disclosure are initially described in the context of an environment supporting an on-demand database service. Additional aspects of the disclosure are described with reference to systems (e.g., including Layer 1 processing, Layer 2 processing, and feature processing), user interactions, and process flows. Aspects of the disclosure are further illustrated by and described with reference to apparatus diagrams, system diagrams, and flowcharts that relate to an omni-platform question answering system.

FIG. 1 illustrates an example of a system 100 for cloud computing that supports an omni-platform question answering system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, subsystem 125 may include one or more servers or server clusters hosting an answer engine. The answer engine may provide efficient and accurate question-answering services for one or more communities of users (e.g., cloud clients 105, contacts 110, or both). A cloud client 105 or contact 110 may submit questions in natural language using a communication platform of a set of possible communication platforms. The possible communication platforms may include email, text messages, service modules, chat bots, forum posts, or any other question submission applications. The answer engine, running as part of the cloud platform 115 or data center 120, may receive the question.

The answer engine may process the question as a natural language query using a multi-layer approach. In a first layer, the answer engine may process the content of the natural language query (e.g., using NLP and other features or algorithms), and may extract information from the query. The answer engine may generate a search query based on the extracted information, and may send the search query to a search service to retrieve a set of documents (e.g., from a data center 120). The documents may contain multiple different types of documents, and may correspond to the natural language query based on the extracted information included in the search query. In a second layer, the answer engine may rank the retrieved documents using a ranking model, where the ranking is based on a comparison of the documents and the question. In this layer, the documents of different types may be ranked separately. A third layer may merge the ranked documents of different types into a single list of ranked documents. The answer engine may select the top ranked documents from the list, and may send these to the cloud client 105 or contact 110 in response to the question. To handle the different communication platforms, the answer engine may modify the response or the documents into a format supported by a given platform.

Figure 2:
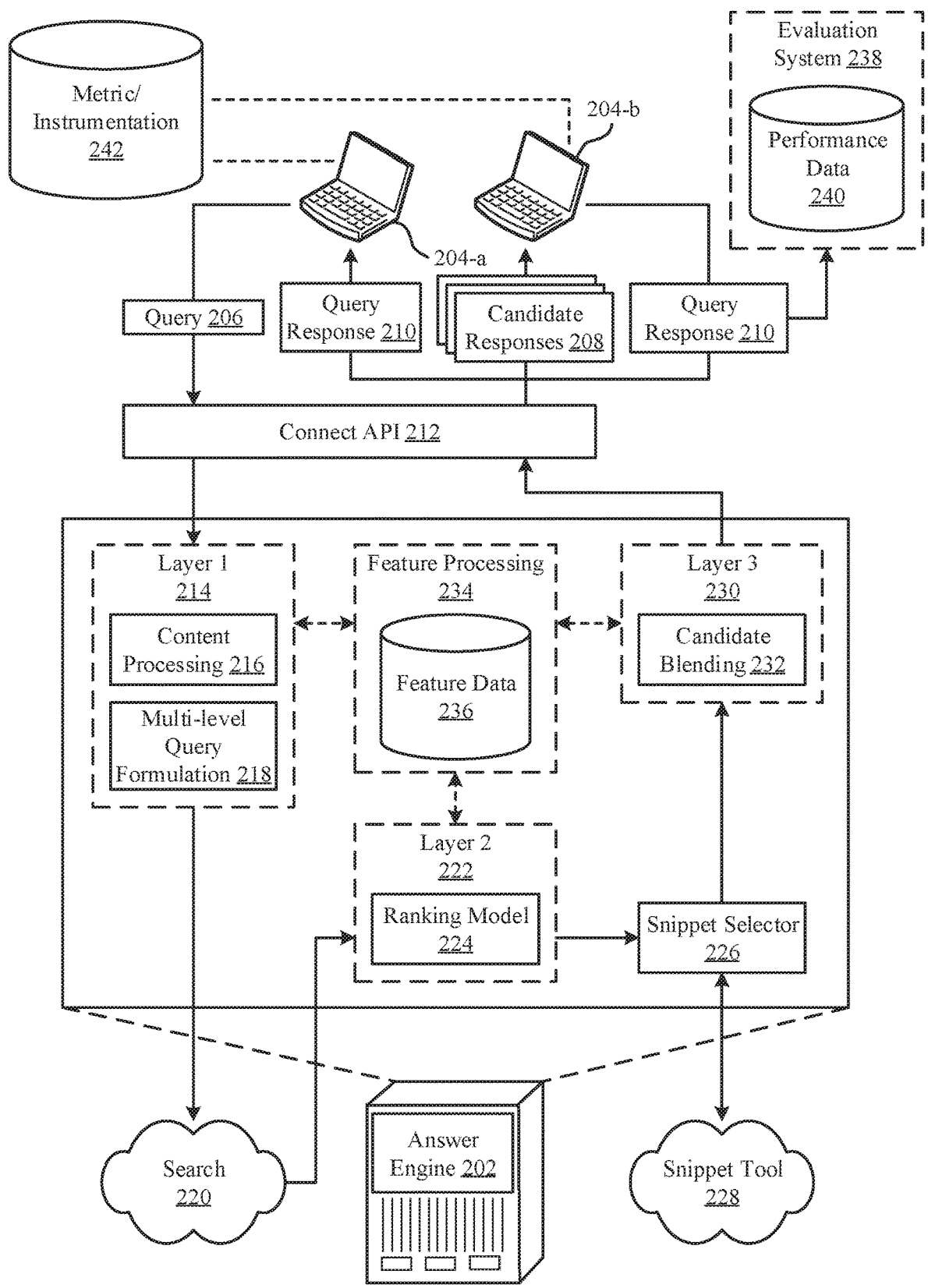
FIG. 2 illustrates an example of a system that supports an omni-platform question answering system in accordance with aspects of the present disclosure.

FIG. 2 illustrates an example of a system 200 that supports an omni-platform question answering system in accordance with aspects of the present disclosure. The system 200 may include a database server hosting an answer engine 202, which may be an example of a multi-layer query-processing engine. Each layer of the answer engine 202 may include a model, such as a machine learned model, for performing a specific process (e.g., determining candidates, ranking candidates, and merging candidates). The answer engine 202 may receive questions, in the form of natural language queries 206, from a user device 204-a associated with a first user or user identifier. This first user may be referred to as an end user or "community" user. The answer engine 202 may process the query 206 and determine a number of candidate responses 208. In some cases, the answer engine 202 may return one or more of these candidate responses 208 to the end user (e.g., at user device 204-*a*). In other cases, the answer engine 202 may send the candidate responses 208 to a user device 204-*b* associated with a second user or user identifier referred to as an intermediate user or "champion" user. In these cases, the intermediate user may select one or more query responses 210 from the candidate responses 208, and the user device 204-*b* or the answer engine 202 may send the selected query response 210 to the end user. In this way, the system 200 may support the end user asking questions over many different types of communication platforms and receiving relevant answers in response.

As illustrated, FIG. 2 represents an example engineering architecture for the system 200. A user (e.g., a community user using the user device 204-*a*) may submit a question in a community. The question may be written in natural language, and in some cases may include a title and a body. Questions may vary in length, but many may contain several hundred words between the title and the body. The user may submit the question using one of many possible communication platforms, including forum posts, emails, text messages, service consoles, social media messages, chat bot messages, or any other native or web applications. The communication platforms may alternatively be referred to as channels. In some cases, a communication platform may contain a topic tree (e.g., created by an administrative user). Each question may include one or more associated topics, where at least one of the topics corresponds to a root topic of the topic tree.

When a question is written to a communication platform, the information related to the question (e.g., the title, body, topics, etc.) may be sent by the user device 204-*a* as a natural language query 206 to a database server or server cluster running the answer engine 202. The answer engine 202 may be a core artificial intelligence (AI) engine for responding to queries 206. In some cases, the backend answer engine 202 may be decoupled from a user interface at the user device 204-*a* using an API 212. The API 212 may connect the user device 204-*a* with the answer engine 202, and in some cases may be an example of a representational state transfer (REST) API 212. The REST API 212 may provide interoperability between user devices 204 and the answer engine 202.

The API 212 may additionally manage varying formats for different communication platforms. For example, a question submitted in a text message may be formatted differently than a question submitted in a forum post. The API 212 may convert the questions into a standard format to be used by the answer engine 202.

When a query—referred to as a natural language query 206 or user query 206—is passed into the answer engine 202 (e.g., from the user device 204-*a* via the connect API 212), the query 206 may be sent to a first layer (Layer 1) 214. Layer 1 214 may perform candidate generation to determine one or more candidate answers to the natural language query 206. Layer 1 214 may include algorithms that take the query 206 as input and may output a number of documents as potential answers to the query. These documents may be examples of articles (e.g., publicly accessible knowledge articles in a community) or previous answers. For example, the system 200 may store previously determined question/answer pairs (e.g., a question posted in a forum, and the corresponding comments or posts), and may select candidate answers from the pairs. In some cases, the system 200 may include other types of documents instead of or in addition to these two types of documents.

In an example process, Layer 1 214 may perform content processing 216 on the query 206. For example, the answer engine 202 may perform an NLP procedure on the query 206 to determine an intent of the query 206 (e.g., using an intent vector), key words within the query 206, key topics associated with the query 206, or any other information related to the text or metadata of the query 206. Based on the information extracted from the natural language query 206, the answer engine 202 may generate a search query using query formulation 218. In some cases, the search query may be an example of a multi-level query. A multi-level query consists of multiple queries (e.g., referred to as sub-queries) of varying restriction levels.

The answer engine 202 may use the search query to retrieve the documents using a search process 220. For example, the answer engine 202 may send the search query to a database storing the documents, and the database may search its stored records based on the query parameters. The database may identify any documents matching the query parameters (e.g., based on an NLP analysis of the document text or the based on topics associated with the document), and may return the identified set of documents based on the parameters of the query. In some cases, the number of documents to return may be based on a configuration of the database or a parameter specified by the search query. This threshold number of documents, n, may be referred to as the minimum document number.

When implementing a multi-level search query, the answer engine 202 may use a first sub-query for the search process 220. The first sub-query may include restrictive query parameters, such that the database may only identify documents closely correlated to the user query 206. In some cases, the database may not identify a number of documents equal to or greater than the minimum document number, n. In these cases, the answer engine 202 may use a second sub-query of the multi-level query for the search process 220. The second sub-query may include query parameters less restrictive than the first sub-query, such that the database may identify more documents (e.g., documents that may be less correlated to the user query 202 than before) based on the second query parameters. The answer engine 202 may iteratively continue to send sub-queries of decreasing restrictiveness until the database identifies and returns a number of documents equal to or greater than the minimum document number.

In some cases, the answer engine 202 may use separate search queries for different document types (e.g., articles and previous questions/answers). Accordingly, the answer engine 202 or database may specify minimum document numbers, n, for each of these document types, where the values of n may be the same or different for the different types. In other cases, the answer engine 202 may use a single search query to retrieve multiple document types. In these cases, the database may select the same number of documents of each type, or may select the documents of either type that most closely correspond to the query parameters. The answer engine 202 may either implement the minimum document number, n, as a minimum or as a set value of documents to retrieve in Layer 1 214. In the latter case, the database or Layer 1 214 may prune the number of documents selected to the minimum document number, n.

The retrieved set of documents may be sent to a second layer (Layer 2) 222 of the answer engine 202. Layer 2 222 may perform ranking of the received documents. For example, Layer 2 222 may include a ranking model 224, which may be an example of a machine learned model. The answer engine 202 may apply the ranking model 224 to the n or more documents received from Layer 1 214. For example, the ranking model may utilize NLP, user feedback, metadata extraction, or any other techniques to determine a correlation value between each document and the user query 206. The ranking model 224 may order the documents in descending order of correlation (e.g., from the documents most correlated to the user query 206 to the documents least correlated to the user query 206). In some cases, the ranking model 224 may additionally prune the number of documents. For example, following ranking of the documents, the ranking model 224 may remove documents from the set of documents down to a maximum document number, k. When pruning, the ranking model 224 may remove documents with lower ranks first, such that the k documents most closely correlated to the user query 206 remain. Similar to document selection, document ranking may be performed on the document types separately, or on all of the document types together. If ranked separately, Layer 2 222 may determine sets of k ranked documents of each document type.

Layer 2 222 may send the ranked documents to a third layer (Layer 3) 230. In some cases, before the ranked documents are sent to Layer 3 230, the ranked documents of certain document types may be sent to a snippet selector 226. The snippet selector 226 may interact with a snippet tool 228 (e.g., Metamind) to identify a portion of document text most relevant to the user query 206. For example, the snippet selector 226 may operate on documents of specific document types (e.g., articles, or any documents exceeding a certain threshold length). The snipper selector 226 may send these documents to the snippet tool 228, which may perform NLP or use other algorithms to identify a portion of text (or an image) within each document that relates most closely to the user query 226. This identified portion of text may be referred to as a "snippet." The function of the snippet tool 228 may be too identify, as accurately as possible, the exact sentences or phrases within a document that answer the user query 206. The snippet tool 228 may return the documents with indications of the identified snippets to the snippet selector 226, and the full set of documents may be passed to Layer 3 230.

Layer 3 230 may perform rank aggregation on the full set of documents. For example, Layer 3 230 may receive a set of documents, where documents of different types are ranked separately. The set of documents may include k articles ranked from most closely correlated to least closely correlated, and k previous question/answers ranked from most closely correlated to least closely correlated. Layer 3 230 may use candidate blending 232 to aggregate the different document types into a single ranked list. In one implementation, the candidate blending 232 may involve interleaving the different document types (e.g., the first document of document type 1, followed by the first document of document type 2, followed by the second document of document type 1, followed by the second document of document type 2, etc.). In a second implementation, the candidate blending 232 may involve assigning a universal ranking score to each document. The scores may be based on a machine learned model involving NLP analysis of the documents, NLP analysis of the snippets, user feedback ratings for the documents, or any combination of these. Layer 3 230 may then rank the documents according to the universal rating scores, regardless of document type. In some cases, similar to Layer 2 222, Layer 3 230 may additionally prune the number of documents. When pruning, the Layer 3 230 may remove documents with lower ranks first, such that the m documents most closely correlated to the user query 206 remain. These m documents may be referred to as candidate responses 208, as each document may potentially be used by the answer engine 202 to respond to the user query 206.

The answer engine 202 may send the candidate responses 208 to a user device 204-b associated with an intermediate or "champion" user (e.g., through the connect API 212). The intermediate user may review the candidate responses 208, and may confirm any candidate responses 208 that apply to the question initially posed by the end user. Each confirmed candidate response may be referred to as a query response 210. Based on this confirmation, one or more query responses 210 may be sent to the user device 204-a. For example, the query response 210 may be sent from the user device 204-b directly, from the user device 204-b through the connect API 212, or from the answer engine 202 (e.g., through the API 212). The answer engine 202 may respond to the user device 204-a according to the communication platform used by the user device 204-a. For example, if the end user submitted the question using email, the answer engine 202 or the intermediate user may email the query response 210 to the user device 204-a. Similarly, if the end user posted the question in a forum, the answer engine 202 or the intermediate user may post the query response 210 as a comment in the forum. The answer engine 202 or the connect API 212 may contain modules for converting a query response 210 into a supported format for each of the communication platforms. The query response 210 may include any type of document (e.g., an article or an answer from a question/answer pair).

In some systems 200, the answer engine 202 may send the candidate responses 208 to the user device 204-a in response to the query 206 (e.g., without the intermediate users). In other systems 200, intermediate users may be used initially while building the machine learned models and evaluating the accuracy of the NLP functions and the ranking algorithms. However, the intermediate users may be removed from the system 200 once the answer engine 202 surpasses a threshold accuracy level or an administrative user overrides the intermediate user confirmation step.

The system 200 may include other components in addition to the components described above. Additionally or alternatively, the architecture described above may utilize pluggable components, such that any components may be tested independently, and may be added or removed from the architecture in order to improve the performance. One example of an additional component is a feature processing module 234 included within the answer engine 202. The feature processing module 234 may store feature data 236, and may send data and feedback to any of the Layers in order to update and improve the machine learned models. Additionally, user feedback may be sent to an evaluation system 238. For example, when an intermediate user selects a query response 210 from a set of candidate responses 208, the user device 204-b may send user feedback to the evaluation system 238. This user feedback may include the initial question submitted by the end user, the set of candidate responses 208, the query response 210, or any combination of these. The evaluation system 238 may store this user feedback as performance data 240, and this performance data 240 may be used (e.g., in conjunction with the feature processing module 234) to update the machine learned models of the answer engine 202. In some cases, additional user feedback may be received from the end users in response to the query responses 210. Additionally or alternatively, metrics and/or implementations 242 may be applied to the user devices 204 in order for the user devices 204 to operate within the system 200.

Figure 3:
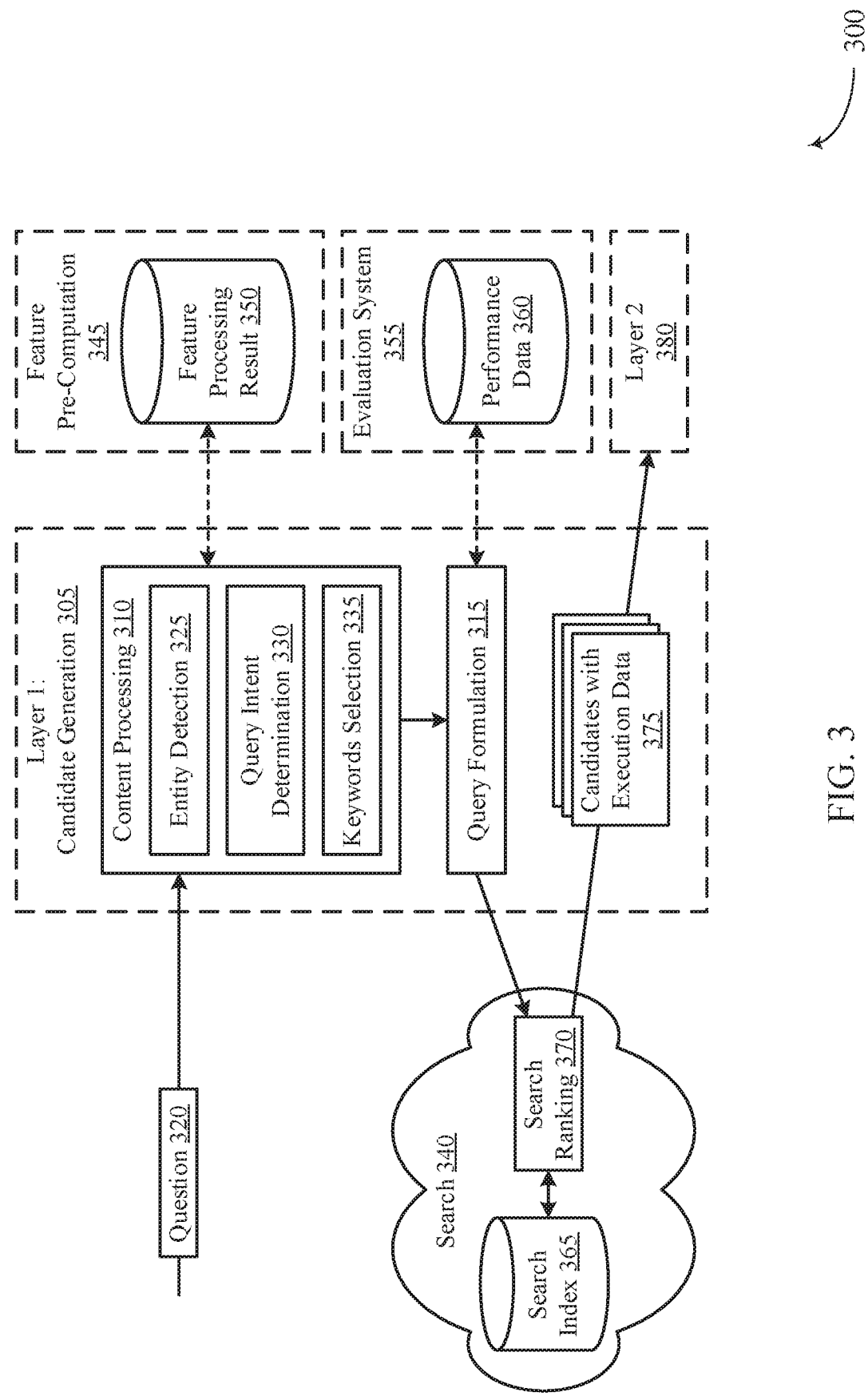
FIG. 3 illustrates an example of Layer 1 processing that supports an omni-platform question answering system in accordance with aspects of the present disclosure.

FIG. 3 illustrates an example of Layer 1 processing 300 that supports an omni-platform question answering system in accordance with aspects of the present disclosure. Components of the Layer 1 processing 300 may be performed by the answer engine 202 or Layer 1 214 as described above with reference to FIG. 2. One or more database servers or server clusters may run these operations. The Layer 1 processing 300 may be performed by a candidate generation layer 305, which may include content processing 310 and query formulation 315. The candidate generation layer 305 may receive a question 320 (e.g., a natural language query) from a user (e.g., through an API), and may identify and send candidate answers to the question 320.

A user may submit a question 320 over a specific communication platform. The candidate generation layer 305 may receive the question 320, and may perform content processing 310 on the question 320. The content processing 310 may include entity detection 325, query intent determination 330, keywords selection 335, or some combination of these or other processing functions. For example, in some cases, the content processing 310 may involve topic extraction, term frequency-inverse document frequency (TF-IDF) determination, or query expansion techniques. The content processing 320 may extract or determine information from the question 320 to use in query formulation 315. In some cases, the Layer 1 processing 300 may implement an external search infrastructure 340. In these cases, the search functionality of the search infrastructure 340 may not be adapted for answer engine-specific functionality. Accordingly, the candidate generation layer 305 may implement the content processing 310 and query formulation 315 in order to construct a search query capable of efficiently retrieving accurate candidate documents based on the search infrastructure 340 in place.

The candidate generation layer 305 may perform NLP analysis on the question 320. In entity detection 325, the candidate generation layer 305 may identify any entities (e.g., metadata entities) associated with the question 320 that may be included in a search query. Query intent determination 330 may involve determining the intent of the question 320 based on word choice, sentence structure, punctuation, or any other information included in the text. Keywords selection 335 may involve selecting one or more words or phrases from the title or body of the question that may be relevant to the search query. Each of these functions may be performed based on machine learned algorithms or models. In some cases, the answer engine may perform the machine learning based on certain features and data. These features or data may be part of a feature pre-computation module 345, which may include feature processing results 350.

Based on the information identified or extracted from the question 320, the candidate generation layer 305 may perform a query formulation 315 process. The query formulation 315 may receive the question 320 and the information obtained in content processing 310 as inputs, and may generate a corresponding search query. The search query may indicate a number of documents, n, to receive in response to the query. Additionally or alternatively, the search query may constrain the recall set (e.g., the documents to search for and retrieve) to a specific topic—such as a topic determined or extracted from the question 320—to improve the accuracy of the search. In some cases, the search query may be an example of a multi-level search query as described above, for example, with reference to FIG. 2. The query formulation 315 may be modified based on user feedback. For example, an evaluation system 355 may store performance data 360. The performance data 360 may be examples of previous question/answer pairs. In some cases, the previous question/answer pairs may include indications of user feedback scores. Higher user feedback scores may correspond to answers that more accurately answered a user's question. This performance data 360 may be used by the candidate generation layer 305 to update the query formulation 315 process in order to improve the search processing and corresponding search results.

The candidate generation layer 305 may send the generated search query to the search infrastructure 340. The search infrastructure 340 may utilize the query parameters to select relevant documents from a database 365 (e.g., using search indexing and stored search indexes). The search infrastructure 340 may assign a search based score to each of the fetched documents based on an analysis of the documents (e.g., the text, the topics, etc.), where higher search based scores may indicate a closer correspondence to the search query. The search infrastructure 340 may perform search ranking 370 on the documents based on the search based scores, and may return the n top ranked (i.e., highest search based scored) candidates to the answer engine. For the answer engine to operate effectively, the value of n may be selected based on an accuracy recall threshold. That is, for a given value of n, the probability that one of the n documents contains the correct answer to the question 320 may be compared to an accuracy recall threshold probability. The value of n may be selected such that the probability is greater than the threshold, ensuring that the candidate generation layer 305 usually fetches at least one document with the correct answer (e.g., performing some tradeoff between efficiency for accuracy).

The search infrastructure 340 and the candidate generation layer 305 may send the fetched candidates with execution data 375 to the next layer in the answer engine procedure, Layer 2 380. The candidates with execution data 375 may include the documents returned based on the search query, the corresponding search based scores, the extracted information from the question 320, or any combination of these.

Figure 4:
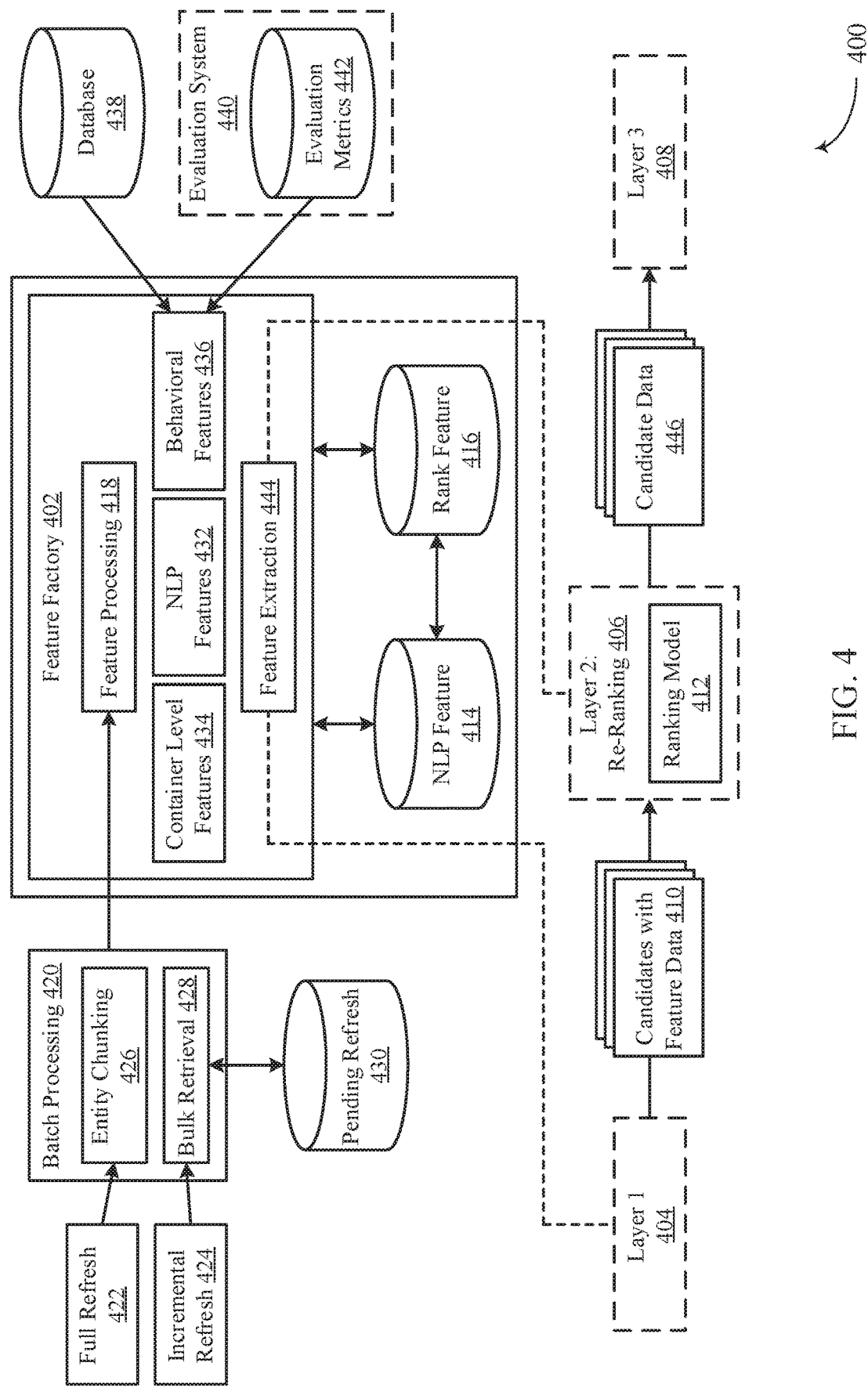
FIG. 4 illustrates an example of Layer 2 and feature processing that supports an omni-platform question answering system in accordance with aspects of the present disclosure.

FIG. 4 illustrates an example of Layer 2 and feature processing 400 that supports an omni-platform question answering system in accordance with aspects of the present disclosure. The Layer 2 and feature processing 400 may be performed by one or more database servers or server clusters hosting an answer engine 202, as described above with reference to FIG. 2. The Layer 2 and feature processing 400 may involve a feature factory 402, which may support multiple layers of an answer engine. For example, the feature factory 402 may support Layer 1 404, Layer 2 (e.g., the re-ranking layer 406), Layer 3 408, or some combination of these layers.

Layer 1 404 may receive a question (e.g., a natural language query) as input over a specific communication platform, and may retrieve candidate documents from a database that may answer the question, for example, as described above with reference to FIG. 3. Layer 1 404 may send the candidates with feature data 410 to the re-ranking layer 406 to modify the ranks of the documents. For example, the documents sent by Layer 1 404 may be ranked based on search based scores. The re-ranking layer 406 may utilize more information about the question and the candidate documents (e.g., contained within feature data) to re-rank the documents. The re-ranking layer 406 may implement a ranking model 412 in order to improve the likelihood that the top ranked documents contain relevant answers to the user submitted question.

The answer engine may construct the ranking model 412 based on various types of features. These features may be hosted or maintained by the feature factory 402. The feature factory 402 may store and load feature information in an NLP features database 414, a rank features database 416, or both. In some cases, information stored in the NLP features database 414 may be used in Layer 1 404 and/or the re-ranking layer 406, and information stored in the rank features database 416 may be used in the re-ranking layer 406.

The feature factory 402 may utilize feature processing 418 to update and maintain the features stored in the feature factory 402. The feature processing 418 may allow for the feature factory 402 to perform machine learning, and accordingly improve the machine learned models in the layers of the answer engine. In some cases, the feature processing 418 may update based on batch processing 420. Batch processing 420 may operate in a full refresh 422 mode or an incremental refresh 424 mode. In the full refresh 422, the batch processing may perform a chunking process 426 (e.g., PKChunking) on all entities (e.g., features, documents, etc.), such that the feature processing 418 is updated with the latest versions of all entities. In the incremental refresh 424, batch processing 420 may perform bulk retrieval 428 to retrieve a subset of entities stored in memory and marked as "pending refresh" 430. The batch processing 420 and the feature factory 402 may refresh the pending entities to improve the accuracy of the feature processing 418.

The feature factory 402 may include NLP features 432 to use in content processing, query generation, or document ranking algorithms. These NLP features 432 may include, but are not limited to, entities, noun phrases, top unigrams, bigrams, n-grams, topics, semantic word vector representations, word inventing, word-to-vector processes, or latent Dirichlet allocation (LDA). The answer engine may use NLP features 432 to extract keywords, topics, or metadata from both the user submitted question and the candidate documents. The ranking model 412 may compare the results of the NLP features 432 to determine a similarity score between the question and each candidate document. These similarity scores may be used for ranking the documents.

Other features may include container level features 434, such as information retrieval based features. These may include information retrieval (IR) features, including ranking functions such as Okapi BM25, various proximity measures, or any other IR features or functions. These features may also determine similarity or dissimilarity scores, which may be used for ranking documents (e.g., alone or in conjunction with other features, such as the NLP features).

The feature factory 402 may additionally or alternatively include behavioral features 436. The behavioral features 436 may include identifying behavioral counts for the candidate documents, such as counts of likes, comments, clicks, views, ratings, or similar parameters. The behavioral features 436 may also track which answers are marked or designated as "best answers" by one or more users. To implement these behavioral counts or parameters, the feature factory 402 may compute the values for variable sized time windows, may normalize the values (e.g., based on time, number of users, etc.), or both. The behavioral features 436 may also include machine learned features, such as generating scores based on a translation model of questions and answers, a probabilistic co-occurrence model for questions and answers, determined intents for questions or answers, classifiers to compute a general quality for an answer, or any combination of these or similar machine learned features.

For the behavioral features 436, the feature factory 402 may retrieve document information from a database 438, user feedback information from an evaluation system 440 and a corresponding evaluation metrics database 442, or both. These may be used to determine the behavioral counts or modify the machine learning. The behavioral features 436 may also include attributes of documents, which may be stored in the database 438 with or without corresponding feedback in the evaluation metrics database 442. The document attributes (e.g., in some cases, question/answer post attributes) may include a parent post identifier, an age of a post (e.g., based on a timestamp), a creation or last modified date associated with a document, managed or unmanaged topics associated with a document, or any other relevant document attributes.

The re-ranking layer 406 may base the ranking model 412 on any number of these or other features. The feature factory 402 may perform feature extraction 444 to provide the layers with the relevant features for performing machine learned algorithms or NLP. The ranking model 412 may perform a combination of the above features on each document included in the candidates with feature data 410. The ranking model 412 may normalize or otherwise aggregate the results from each of the implemented features, and may use these aggregated scores to re-rank the documents. In some cases, the re-ranking layer 406 may prune this re-ranked list of documents (e.g., removing the lower ranked documents to leave the highest ranked k documents). An evaluation module may evaluate the accuracy of the re-ranking layer 406 ranking model 412 by averaging the precision of these k documents (e.g., how often at least one of these k documents contains the answer to the user input question). The re-ranking layer 406 may send these re-ranked k documents in candidate data 446 to Layer 3 408. In some cases, the re-ranked documents may be ranked separately by document type, either for a total of k documents or including k of each type of document. Layer 3 408 may merge the separate document rankings into a single set of ranked documents. Layer 3 408 may be evaluated for efficiency and accuracy similar to the re-ranking layer 406, but the re-ranking layer 406 may be evaluated on a document type-by-document type basis, while Layer 3 406 may be evaluated based on the combined set of documents.

Figure 5:
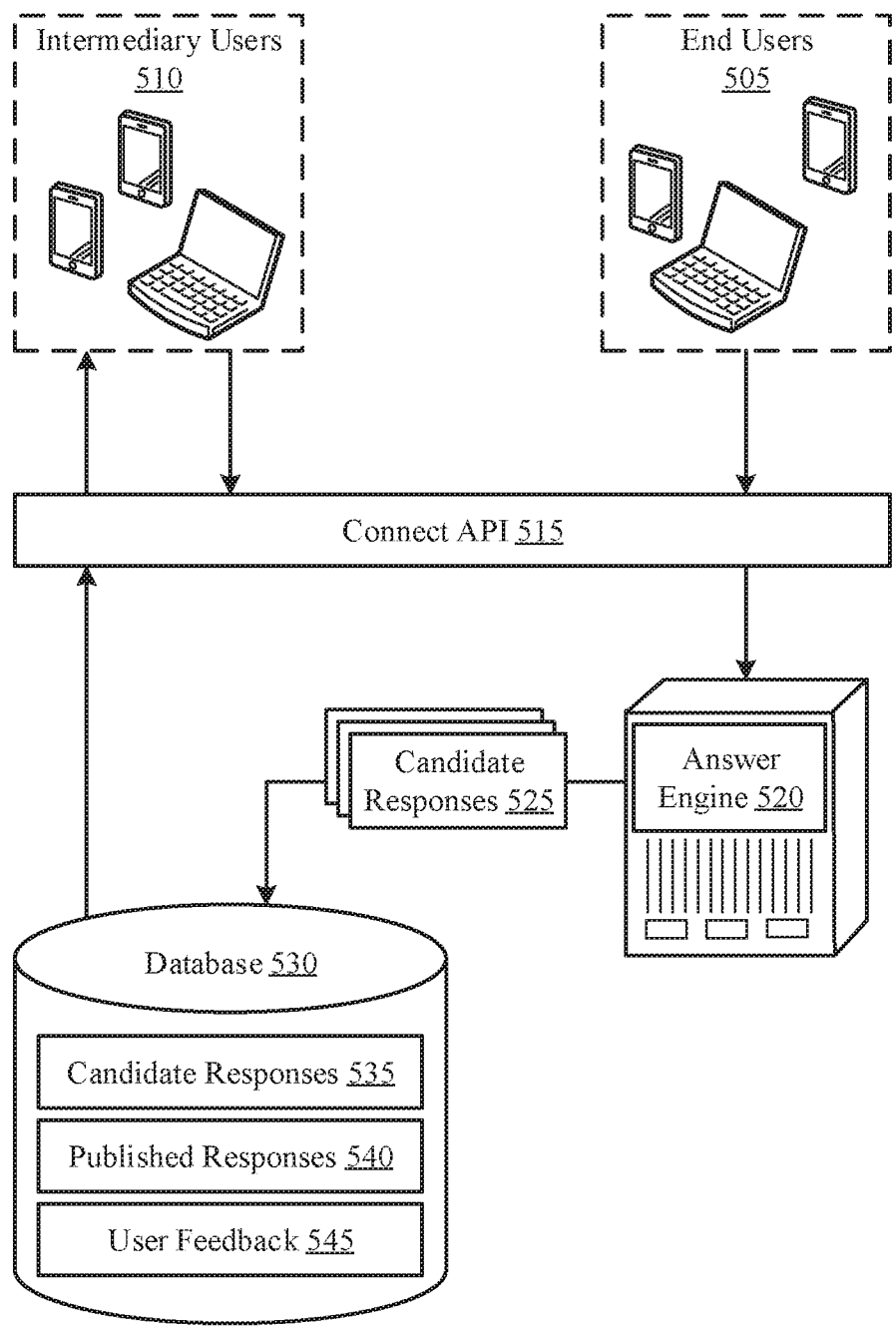
FIG. 5 illustrates an example of user interactions within a system that supports an omni-platform question answering system in accordance with aspects of the present disclosure.

FIG. 5 illustrates an example of user interactions within a system 500 that supports an omni-platform question answering system in accordance with aspects of the present disclosure. The system 500 may include two groups of users: end users 505 and intermediary or intermediate users 510. Both sets of users may interact, using any number or type of user devices, with one or more database servers or server clusters running an answer engine 520. The interaction between the users and the answer engine 520 may be managed by a connect API 515. The end users 505, intermediate users 510, connect API 515, or answer engine 520 may be examples of the devices described above, for example, with reference to FIG. 2. The users may provide feedback to the answer engine 520 so that the answer engine 520 may perform machine learning.

As described above with reference to FIG. 2, one or more end users 505, who may alternatively be referred to as community users, may submit questions over one or more communication platforms. These questions may be formatted or otherwise modified in the connect API 515, and may be sent to the answer engine 520. The answer engine 520 may generate a set of candidate responses 525 utilizing the methods described above, for example, with reference to FIGS. 2 through 4, and may send these candidate responses 525 to a database 530 for storage. The database 530 may store records of candidate responses 535 in memory.

The database 530 or the answer engine 520 may send the candidate responses 525 to one or more intermediary users 510, who may alternatively be referred to as champion users, for review. The candidate responses 525 may be modified or formatted by the connect API 515 so that an intermediary-specific user interface of a user device may display the candidate responses 525. The intermediary users 510 may be examples of experts in a given topic or field. In some cases, certain candidate responses 525 may be forwarded to specific intermediary users 510 based on an identified topic of a question or answer. The intermediary users 510 may review the candidate responses 525, and may select any number of the candidate responses 525 for publication. If the intermediary user 510 does not select any candidate response 525, the answer engine 520 may repeat the candidate selection using alternative algorithms or models, or using larger numbers of documents at each step (e.g., for the values of n, k, and/or m). Otherwise, if the intermediary user 510 selects one or more candidate responses 525 for publication, the selected responses may be sent to the end users 505. For example, the selected candidate responses may be passed to the connect API 515, which may format the responses for the communication platform of the submitted question, and may submit the selected candidate responses. In some cases, these selected candidate responses may additionally be stored in memory as published responses 540 at the database 530.

The database 530 and answer engine 520 may additionally receive user feedback from the intermediary users 510, the end users 505, or both. The user feedback may include scores for how helpful certain responses are, rankings of responses, like, comments, selected "best answers," or any similar types of user feedback. The database 530 may store this user feedback 545 in memory.

The candidate responses 535, published responses 540, user feedback 545, or some combination of these records may be used by the answer engine 520 to evaluate the algorithms, models, and processes used to determine the responses. For example, the answer engine 520 may evaluate the coverage (e.g., a percentage of user submitted questions answered), accuracy (e.g., a percentage of answers found to be useful), growth (e.g., a number of questions, answers, or user interactions during a given time period), performance (e.g., an average time to determine an answer to a question), or some combination of these metrics based on the data stored in the database 530. Additionally or alternatively, the answer engine 520 may perform machine learning based on this data to improve the functionality of the answer engine 520.

In some cases, the answer engine 520 may initially operate using an offline model, referred to as a global model, trained on labeled training data. Using the user feedback described above, the answer engine may update this global model to perform better for a given community of users. In some cases, the above process utilizing intermediary user 510 confirmation may occur until the answer engine 520 meets specific metric thresholds (e.g., reaches a specified threshold coverage, accuracy, growth, performance, or some combination of these thresholds). In these cases, the answer engine 520 may then transition to providing published responses directly, rather than waiting for validation by the intermediary users 510.

Figure 6:
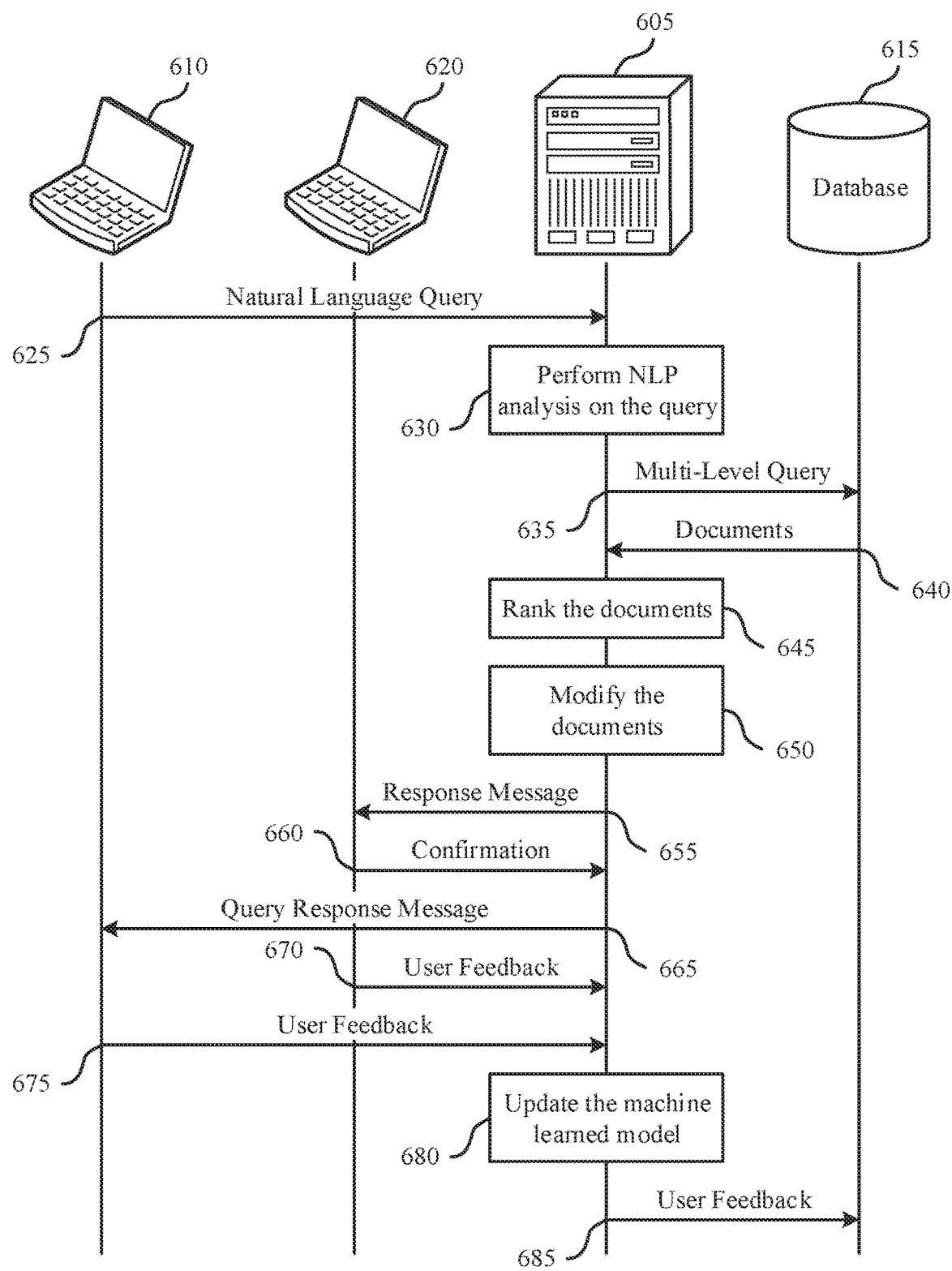
FIG. 6 illustrates an example of a process flow that supports an omni-platform question answering system in accordance with aspects of the present disclosure.

FIG. 6 illustrates an example of a process flow 600 that supports an omni-platform question answering system in accordance with aspects of the present disclosure. The process flow 600 may include a database server 605 which may host an answer engine, a user device 610 associated with an end user, a database 615, and a user device 620 associated with an intermediate user. These devices may be examples of the devices or components described above, for example, with reference to FIGS. 2 through 5. The database server 605 may perform natural language query processing to determine an accurate response to the query using an archived set of documents stored at the database 615.

At 625, the database server 605 may receive a natural language query over a communication platform. For example, the user device 610 may submit the natural language query in the form of a question in an email, a text message, a social media message, a web application, a native application, a forum post, or any other supported question-submission procedure.

At 630, the database server 605 may perform NLP analysis on the natural language query. In some cases, performing the NLP analysis may involve identifying an intent vector for the query. Based on the NLP analysis, the database server 605 may generate a search query. The search query may be an example of a multi-level query, including multiple sub-queries.

At 635, the database server 605 may send the search query to a database 615, the database containing documents of different types (e.g., previous query posts and accessible articles). The database 615 may search its records based on the search query, and may identify one or more documents corresponding to the query. At 640, the database 615 may send the one or more documents to the database server 605 in response to the search query.

If the search query is a multi-level query, the search query may include multiple sub-queries. The database server 605 may send a first sub-query of the multi-level query to the database 620, and may receive a number of documents in response less than a threshold number of documents, n. The database server 605 may send a second sub-query of the multi-level query with fewer restrictions than the first sub-query to the database 615 based on not receiving n documents. This process may continue iteratively, with the database server 605 sending increasingly broader sub-queries until the database 615 retrieves and returns at least n documents in response to the sub-query.

At 645, the database server 605 may rank the received documents, for example, using a machine learned model. The machine learned model may be based on a standard or base model, and may be updated using user feedback. In some cases, the database server 605 may rank the documents into an ordered list (e.g., with the higher ranked documents more relevant to the natural language query), and may remove a number of the documents from the list based on a number of documents to rank, k. The database server 605 may rank documents of different types into separate lists, and may later merge the lists together to form a single list including multiple document types.

At 650, the database server 605 may modify the documents based on the communication platform over which the natural language query was received. For example, different communication platforms may accept different formats of answers or documents. The database server 605 may format the documents such that the query response may be displayed in a user interface of the end user.

At 655, the database server 605 may send an indication of a query response message to the user device 620 associated with the intermediate user. In some cases, the intermediate user may send a confirmation message corresponding to at least one of the documents indicated in the query response message at 660. The database server 605 may modify the query response message to remove documents that were not confirmed by the intermediate user.

At 665, the database server 605 may send the query response message to the user device 610 in response to the natural language query. The query response message may be sent over the same communication platform that the natural language query was received over. The documents and/or the query response message may be modified in such a way to support being sent and displayed to the end user using the communication platform.

At 670 and 675, the database server 605 may receive user feedback from the intermediate user and the end user. At 680, the database server 605 may update a machine learned model. For example, the database server 605 may update a machine learned model for NLP analysis, search query generation, document ranking, or any combination of these. Additionally or alternatively, at 685, the database server 605 may send the user feedback, the query request message, the natural language query, or some combination of these to the database 615. This information may be an example of a previous query post, and may be used as a document fetched by a search process in the future.

Figure 7:
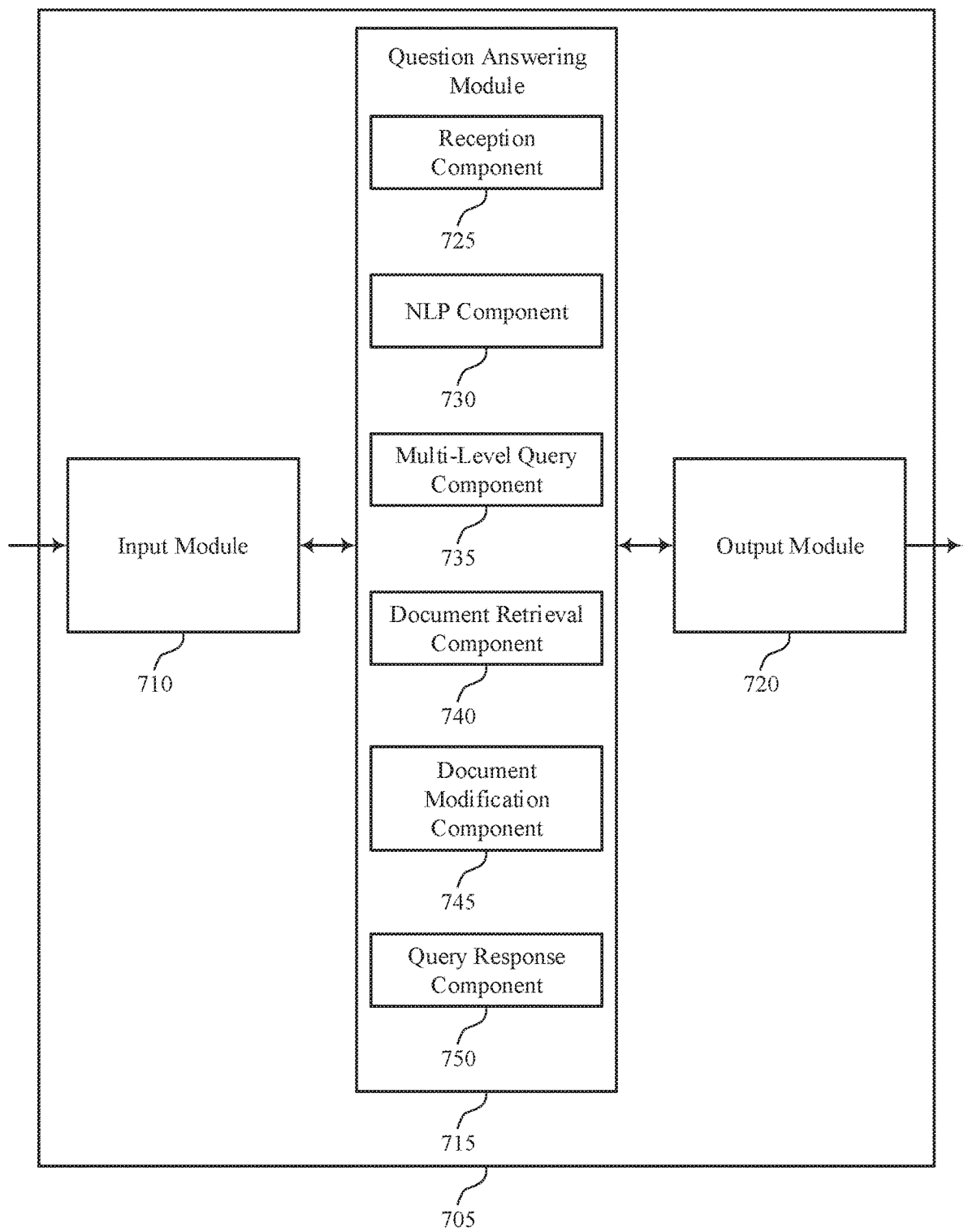
FIGS. 7 and 8 show block diagrams of a device that supports an omni-platform question answering system in accordance with aspects of the present disclosure.

FIG. 7 shows a block diagram 700 of an apparatus 705 that supports an omni-platform question answering system in accordance with aspects of the present disclosure. Apparatus 705 may include input module 710, question answering module 715, and output module 720. Apparatus 705 may also include a processor. Each of these components may be in communication with one another (e.g., via one or more buses). In some cases, apparatus 705 may be an example of a user terminal, a database server, or a system containing multiple computing devices.

Question answering module 715 may be an example of aspects of the question answering module 915 described with reference to FIG. 9. Question answering module 715 may also include reception component 725, NLP component 730, multi-level query component 735, document retrieval component 740, document modification component 745, and query response component 750.

Question answering module 715 and/or at least some of its various sub-components may be implemented in hardware, software executed by a processor, firmware, or any combination thereof. If implemented in software executed by a processor, the functions of the question answering module 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The question answering module 715 and/or at least some of its various sub-components may be physically located at various positions, including being distributed such that portions of functions are implemented at different physical locations by one or more physical devices. In some examples, question answering module 715 and/or at least some of its various sub-components may be a separate and distinct component in accordance with various aspects of the present disclosure. In other examples, question answering module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Reception component 725 may receive a natural language query over a communication platform of a set of communication platforms. In some cases, the natural language query is received from a user device associated with an end user. In some cases, the communication platform includes an email, a short message service (SMS) text message, a social media message, a web application, a native application, or a combination thereof. NLP component 730 may perform an NLP analysis on the natural language query.

Multi-level query component 735 may send a multi-level query based on the NLP analysis to a database, where the database includes documents of different document types. In some cases, the multi-level query includes a set of sub-queries. Multi-level query component 735 may send a first sub-query of the set of sub-queries to the database. In some cases, document retrieval component 740 may receive a number of documents in response to the first sub-query that is less than a threshold number of documents. In these cases, multi-level query component 735 may send a second sub-query of the set of sub-queries based on the received number of documents being less than the threshold number of documents, where the second sub-query includes fewer restrictions than the first sub-query. In some cases, the different document types include posts associated with previous queries and accessible articles.

Document retrieval component 740 may receive one or more documents from the database in response to the multi-level query. Document modification component 745 may modify the one or more documents based on the communication platform over which the natural language query was received.

Query response component 750 may send a query response message in response to the natural language query over the communication platform, where the query response message includes the modified one or more documents. In some cases, the query response message is sent to the end user.

Figure 8:
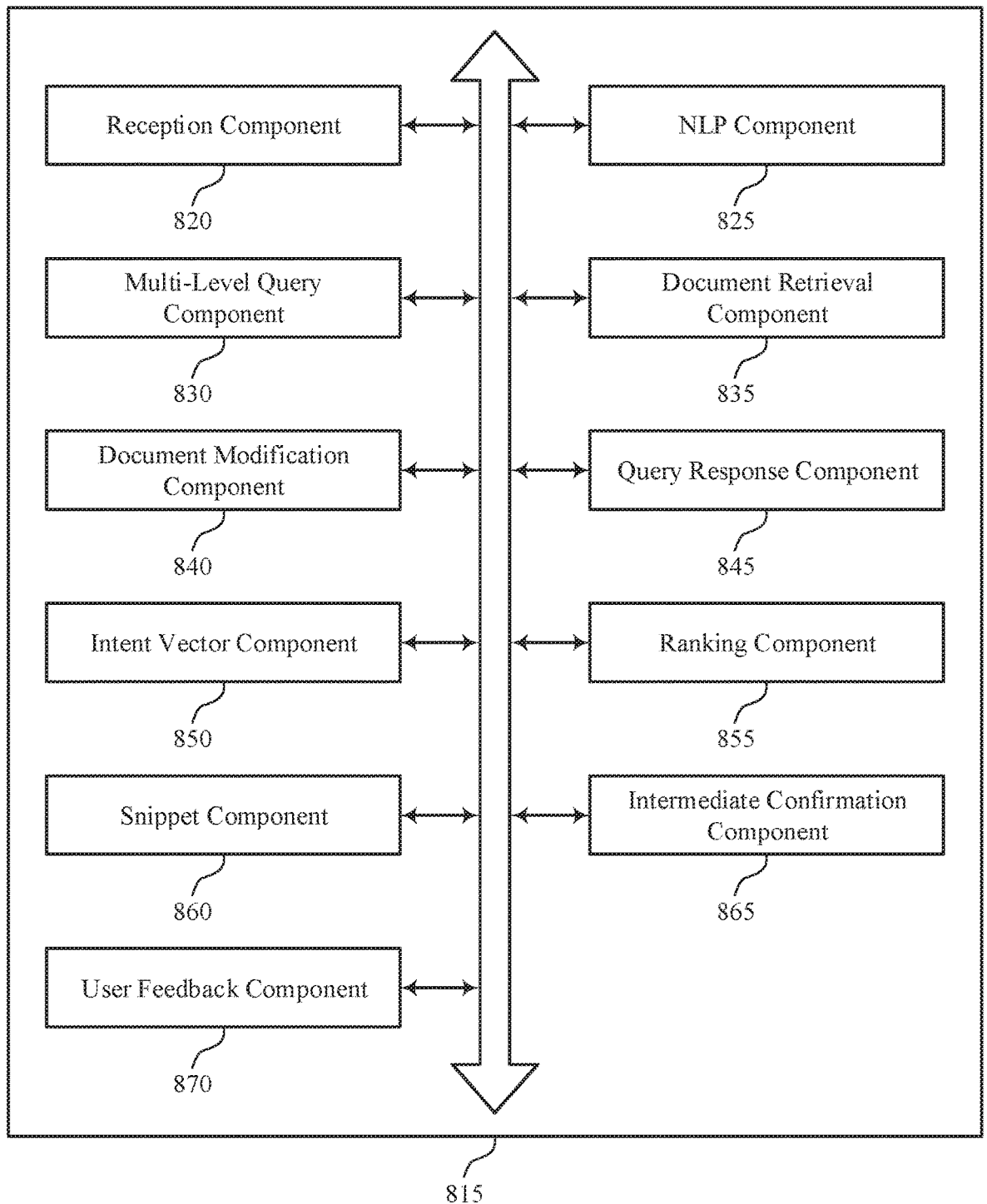

FIG. 8 shows a block diagram 800 of a question answering module 815 that supports an omni-platform question answering system in accordance with aspects of the present disclosure. The question answering module 815 may be an example of aspects of a question answering module 715 or 915 described with reference to FIGS. 7 and 9. The question answering module 815 may include reception component 820, NLP component 825, multi-level query component 830, document retrieval component 835, document modification component 840, query response component 845, intent vector component 850, ranking component 855, snippet component 860, intermediate confirmation component 865, and user feedback component 870. Each of these modules may communicate, directly or indirectly, with one another (e.g., via one or more buses).

Reception component 820 may receive a natural language query over a communication platform of a set of communication platforms. In some cases, the natural language query is received from a user device associated with an end user. In some cases, the communication platform includes an email, an SMS text message, a social media message, a web application, a native application, or a combination thereof. NLP component 825 may perform an NLP analysis on the natural language query.

Multi-level query component 830 may send a multi-level query based on the NLP analysis to a database, where the database includes documents of different document types. In some cases, the multi-level query includes a set of sub-queries. Multi-level query component 830 may send a first sub-query of the set of sub-queries to the database. In some cases, document retrieval component 835 may receive a number of documents in response to the first sub-query that is less than a threshold number of documents. In these cases, multi-level query component 830 may send a second sub-query of the set of sub-queries based on the received number of documents being less than the threshold number of documents, where the second sub-query includes fewer restrictions than the first sub-query. In some cases, the different document types include posts associated with previous queries and accessible articles.

Document retrieval component 835 may receive one or more documents from the database in response to the multi-level query. Document modification component 840 may modify the one or more documents based on the communication platform over which the natural language query was received.

Query response component 845 may send a query response message in response to the natural language query over the communication platform, where the query response message includes the modified one or more documents. In some cases, the query response message is sent to the end user.

Intent vector component 850 may identify an intent vector for the natural language query based on the NLP analysis and may determine the multi-level query based on the intent vector.

Ranking component 855 may receive a total set of documents from the database in response to the multi-level query, where the total set of documents includes the one or more documents, rank the total set of documents using a machine learned model, and select the one or more documents from the total set of documents based on the ranking and a configured number of documents to return. In some cases, the total set of documents includes a first set of documents and a second set of documents, the first set of documents including posts associated with previous queries and the second set of documents including accessible articles. In these cases, ranking component 855 may rank the first set of documents and the second set of documents separately. In some cases, selecting the one or more documents from the total set of documents includes combining a first subset of the first set of documents and a second subset of the second set of documents based on the ranking and the configured number of documents to return.

In some cases, NLP component 825 may perform a further NLP analysis on the one or more documents. Snippet component 860 may identify a snippet from at least one of the one or more documents based on the further NLP analysis, where the query response message indicates the snippet.

Intermediate confirmation component 865 may send an indication of the query response message to an intermediate user, and may receive a confirmation message from the intermediate user in response, where the query response message is sent to the end user based on receiving the confirmation message from the intermediate user.

In some cases, user feedback component 870 may receive user feedback from the end user indicating a usefulness score of the query request message, and may send the user feedback, the query request message, the natural language query, or a combination of these to the database to be added to the documents. In some cases, user feedback component 870 may receive user feedback from the end user in response to the query response message, and may train a machine learned model using the user feedback, where the NLP analysis or a ranking procedure for the one or more documents is based on the machine learned model.

Figure 9:
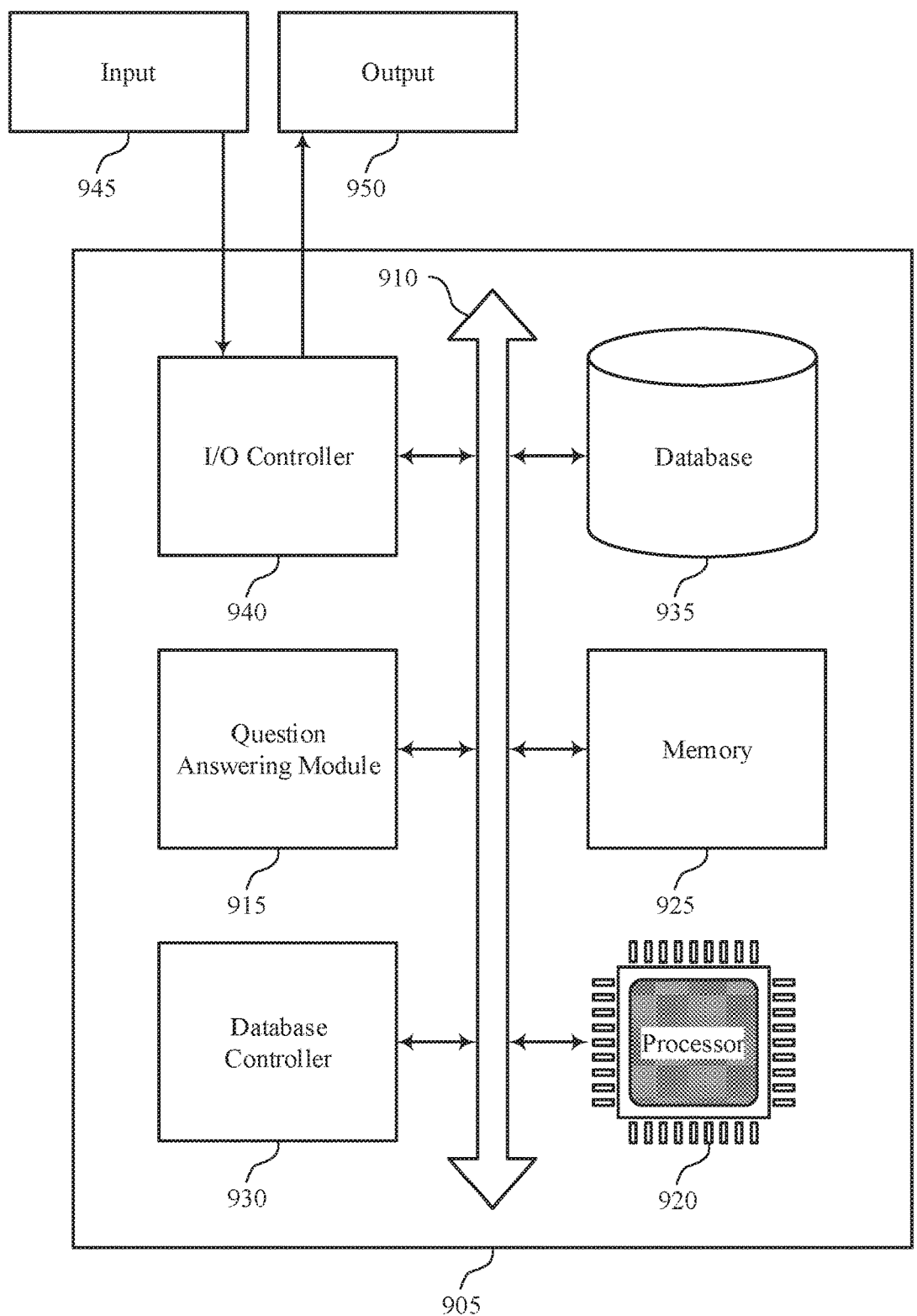
FIG. 9 illustrates a block diagram of a system including a database server that supports an omni-platform question answering system in accordance with aspects of the present disclosure.

FIG. 9 shows a diagram of a system 900 including a device 905 that supports an omni-platform question answering system in accordance with aspects of the present disclosure. Device 905 may be an example of or include the components of database server hosting an answer engine as described above, e.g., with reference to FIGS. 2 through 6. Device 905 may include components for bi-directional data communications including components for transmitting and receiving communications, including question answering module 915, processor 920, memory 925, database controller 930, database 935, and I/O controller 940. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting an omni-platform question answering system).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Database controller 930 may manage data storage and processing in database 935. In some cases, a user may interact with database controller 930. In other cases, database controller 930 may operate automatically without user interaction. Database 935 may be an example of a single database, a distributed database, multiple distributed databases, or an emergency backup database.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

Figure 10:
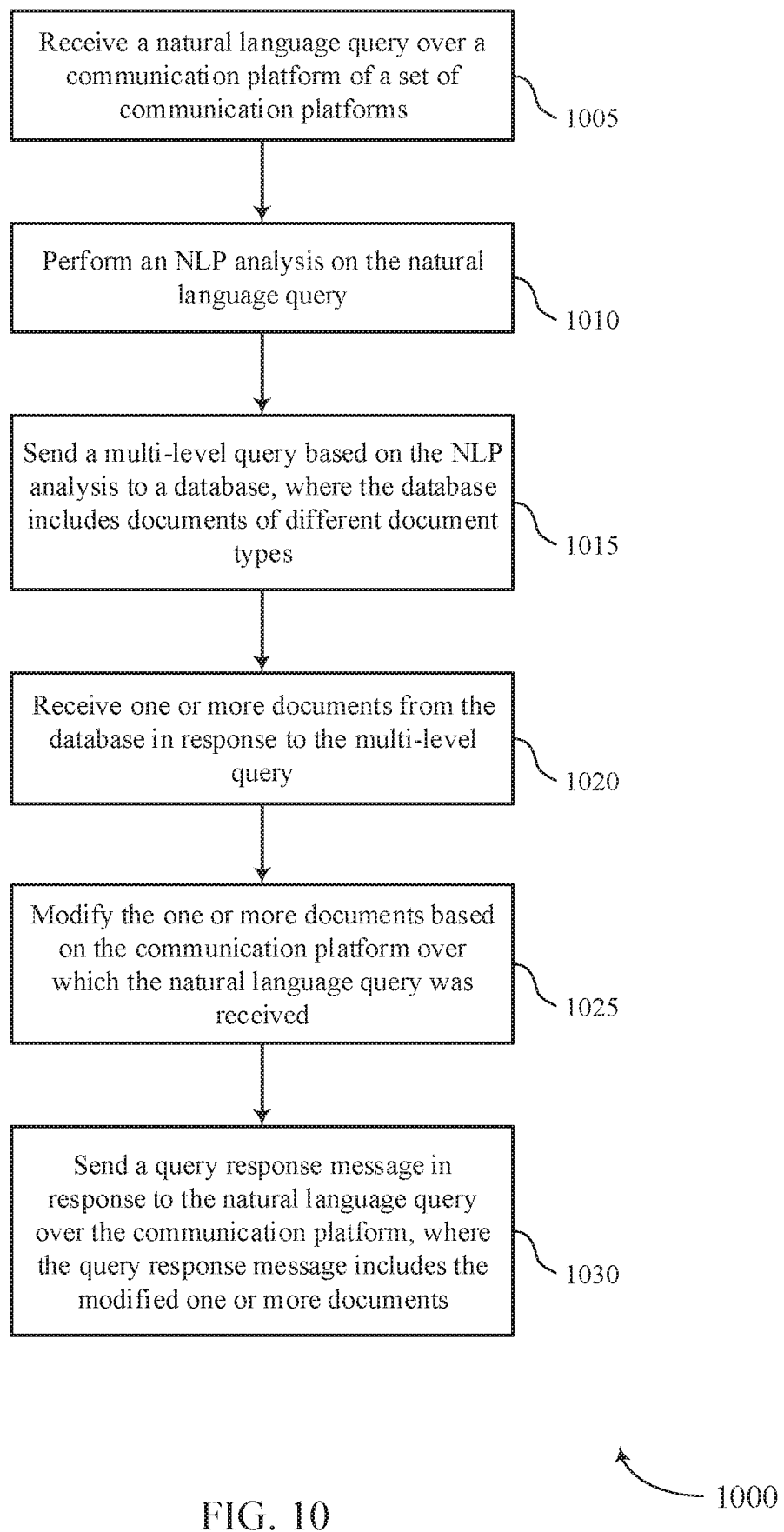
FIGS. 10 through 13 illustrate methods for an omni-platform question answering system in accordance with aspects of the present disclosure.

FIG. 10 shows a flowchart illustrating a method 1000 for an omni-platform question answering system in accordance with aspects of the present disclosure. The operations of method 1000 may be implemented by a database server hosting an answer engine or its components as described herein. For example, the operations of method 1000 may be performed by a question answering module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1005 the database server may receive a natural language query over a communication platform of a set of communication platforms. The operations of 1005 may be performed according to the methods described herein. In certain examples, aspects of the operations of 1005 may be performed by a reception component as described with reference to FIGS. 7 through 9.

At 1010 the database server may perform an NLP analysis on the natural language query. The operations of 1010 may be performed according to the methods described herein. In certain examples, aspects of the operations of 1010 may be performed by an NLP component as described with reference to FIGS. 7 through 9.

At 1015 the database server may send a multi-level query based at least in part on the NLP analysis to a database, where the database contains documents of different document types. The operations of 1015 may be performed according to the methods described herein. In certain examples, aspects of the operations of 1015 may be performed by a multi-level query component as described with reference to FIGS. 7 through 9.

At 1020 the database server may receive one or more documents from the database in response to the multi-level query. The operations of 1020 may be performed according to the methods described herein. In certain examples, aspects of the operations of 1020 may be performed by a document retrieval component as described with reference to FIGS. 7 through 9.

At 1025 the database server may modify the one or more documents based at least in part on the communication platform over which the natural language query was received. The operations of 1025 may be performed according to the methods described herein. In certain examples, aspects of the operations of 1025 may be performed by a document modification component as described with reference to FIGS. 7 through 9.

At 1030 the database server may send a query response message in response to the natural language query over the communication platform, where the query response message includes the modified one or more documents. The operations of 1030 may be performed according to the methods described herein. In certain examples, aspects of the operations of 1030 may be performed by a query response component as described with reference to FIGS. 7 through 9.

Figure 11:
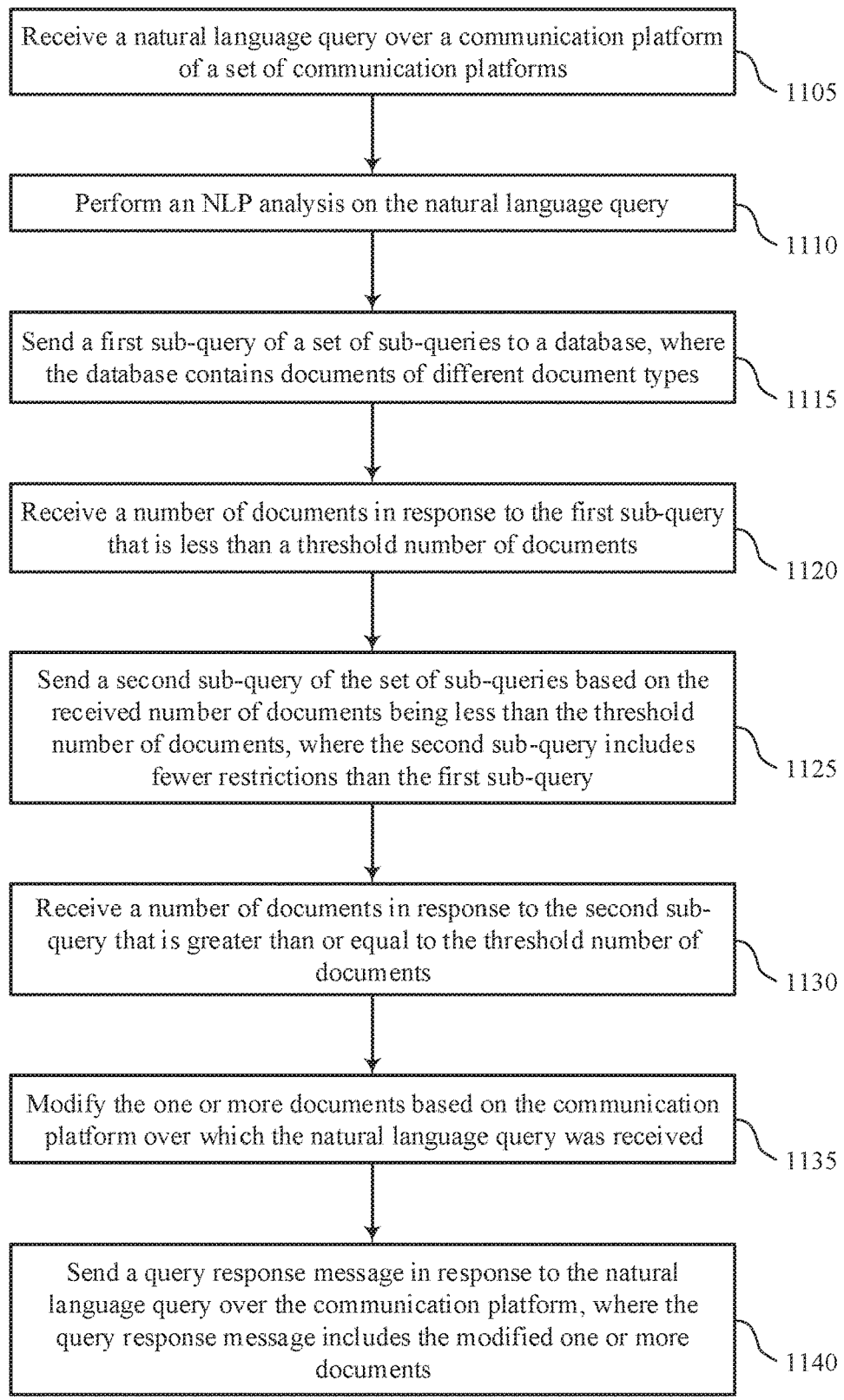

FIG. 11 shows a flowchart illustrating a method 1100 for an omni-platform question answering system in accordance with aspects of the present disclosure. The operations of method 1100 may be implemented by a database server hosting an answer engine or its components as described herein. For example, the operations of method 1100 may be performed by a question answering module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1105 the database server may receive a natural language query over a communication platform of a set of communication platforms. The operations of 1105 may be performed according to the methods described herein. In certain examples, aspects of the operations of 1105 may be performed by a reception component as described with reference to FIGS. 7 through 9.

At 1110 the database server may perform an NLP analysis on the natural language query. The operations of 1110 may be performed according to the methods described herein. In certain examples, aspects of the operations of 1110 may be performed by an NLP component as described with reference to FIGS. 7 through 9.

At 1115 the database server may send a first sub-query of a set of sub-queries to a database, where the database contains documents of different document types. For example, the first sub-query may be a portion of a multi-level query. The operations of 1115 may be performed according to the methods described herein. In certain examples, aspects of the operations of 1115 may be performed by a multi-level query component as described with reference to FIGS. 7 through 9.

At 1120 the database server may receive a number of documents in response to the first sub-query that is less than a threshold number of documents. The operations of 1120 may be performed according to the methods described herein. In certain examples, aspects of the operations of 1120 may be performed by a multi-level query component as described with reference to FIGS. 7 through 9.

At 1125 the database server may send a second sub-query of the set of sub-queries based at least in part on the received number of documents being less than the threshold number of documents, where the second sub-query includes fewer restrictions than the first sub-query. The operations of 1125 may be performed according to the methods described herein. In certain examples, aspects of the operations of 1125 may be performed by a multi-level query component as described with reference to FIGS. 7 through 9.

At 1130 the database server may receive one or more documents from the database in response to the second sub-query. The one or more documents may contain a number of documents that is greater than or equal to the threshold number of documents. The operations of 1130 may be performed according to the methods described herein. In certain examples, aspects of the operations of 1130 may be performed by a document retrieval component as described with reference to FIGS. 7 through 9.

At 1135 the database server may modify the one or more documents based at least in part on the communication platform over which the natural language query was received. The operations of 1135 may be performed according to the methods described herein. In certain examples, aspects of the operations of 1135 may be performed by a document modification component as described with reference to FIGS. 7 through 9.

At 1140 the database server may send a query response message in response to the natural language query over the communication platform, where the query response message includes the modified one or more documents. The operations of 1140 may be performed according to the methods described herein. In certain examples, aspects of the operations of 1140 may be performed by a query response component as described with reference to FIGS. 7 through 9.

Figure 12:
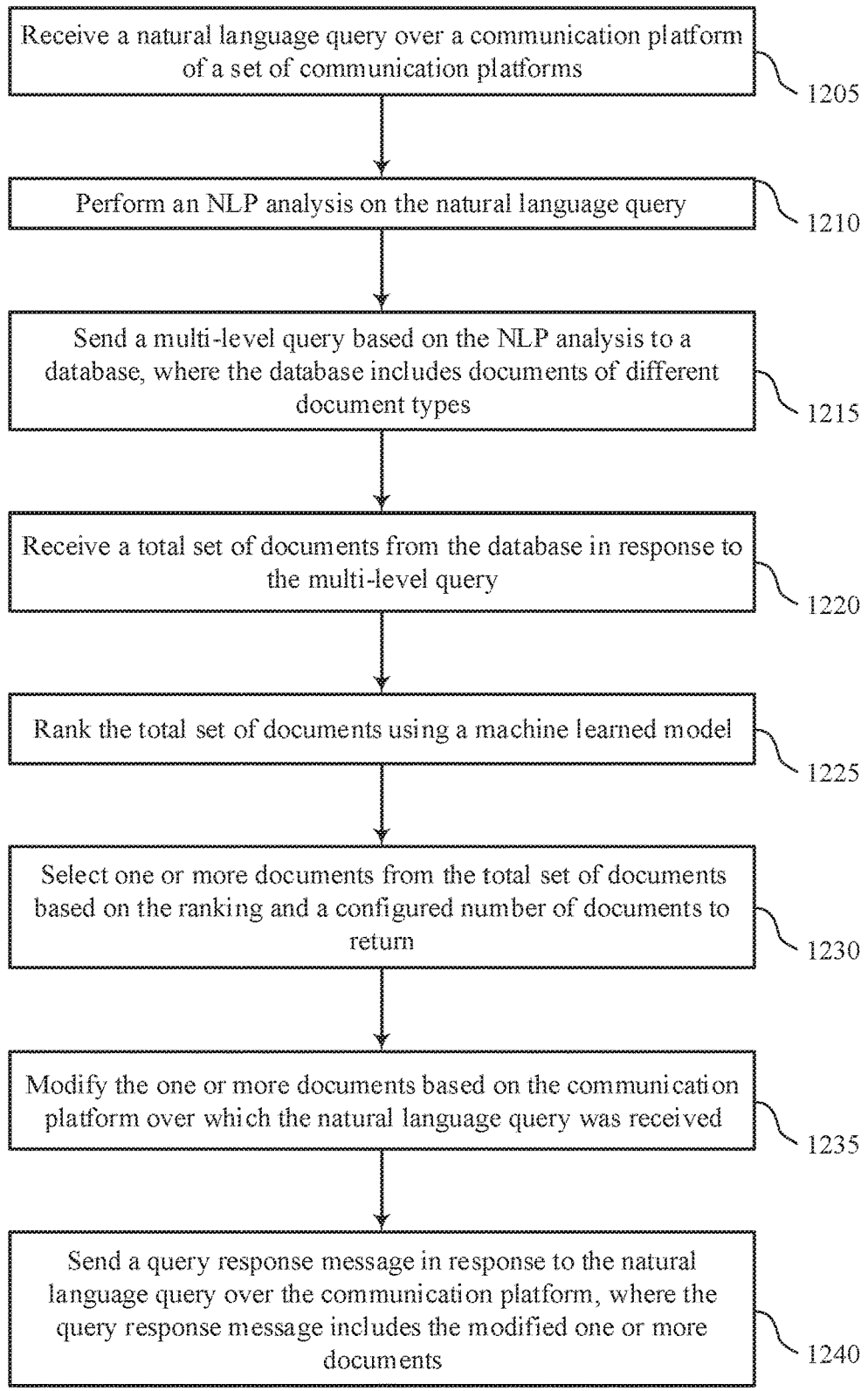

FIG. 12 shows a flowchart illustrating a method 1200 for an omni-platform question answering system in accordance with aspects of the present disclosure. The operations of method 1200 may be implemented by a database server hosting an answer engine or its components as described herein. For example, the operations of method 1200 may be performed by a question answering module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1205 the database server may receive a natural language query over a communication platform of a set of communication platforms. The operations of 1205 may be performed according to the methods described herein. In certain examples, aspects of the operations of 1205 may be performed by a reception component as described with reference to FIGS. 7 through 9.

At 1210 the database server may perform an NLP analysis on the natural language query. The operations of 1210 may be performed according to the methods described herein. In certain examples, aspects of the operations of 1210 may be performed by an NLP component as described with reference to FIGS. 7 through 9.

At 1215 the database server may send a multi-level query based at least in part on the NLP analysis to a database, where the database contains documents of different document types. The operations of 1215 may be performed according to the methods described herein. In certain examples, aspects of the operations of 1215 may be performed by a multi-level query component as described with reference to FIGS. 7 through 9.

At 1220 the database server may receive a total set of documents from the database in response to the multi-level query. The operations of 1220 may be performed according to the methods described herein. In certain examples, aspects of the operations of 1220 may be performed by a ranking component as described with reference to FIGS. 7 through 9.

At 1225 the database server may rank the total set of documents using a machine learned model. The operations of 1225 may be performed according to the methods described herein. In certain examples, aspects of the operations of 1225 may be performed by a ranking component as described with reference to FIGS. 7 through 9.

At 1230 the database server may select one or more documents from the total set of documents based at least in part on the ranking and a configured number of documents to return. The operations of 1230 may be performed according to the methods described herein. In certain examples, aspects of the operations of 1230 may be performed by a ranking component as described with reference to FIGS. 7 through 9.

At 1235 the database server may modify the one or more documents based at least in part on the communication platform over which the natural language query was received. The operations of 1235 may be performed according to the methods described herein. In certain examples, aspects of the operations of 1235 may be performed by a document modification component as described with reference to FIGS. 7 through 9.

At 1240 the database server may send a query response message in response to the natural language query over the communication platform, where the query response message includes the modified one or more documents. The operations of 1240 may be performed according to the methods described herein. In certain examples, aspects of the operations of 1240 may be performed by a query response component as described with reference to FIGS. 7 through 9.

Figure 13:
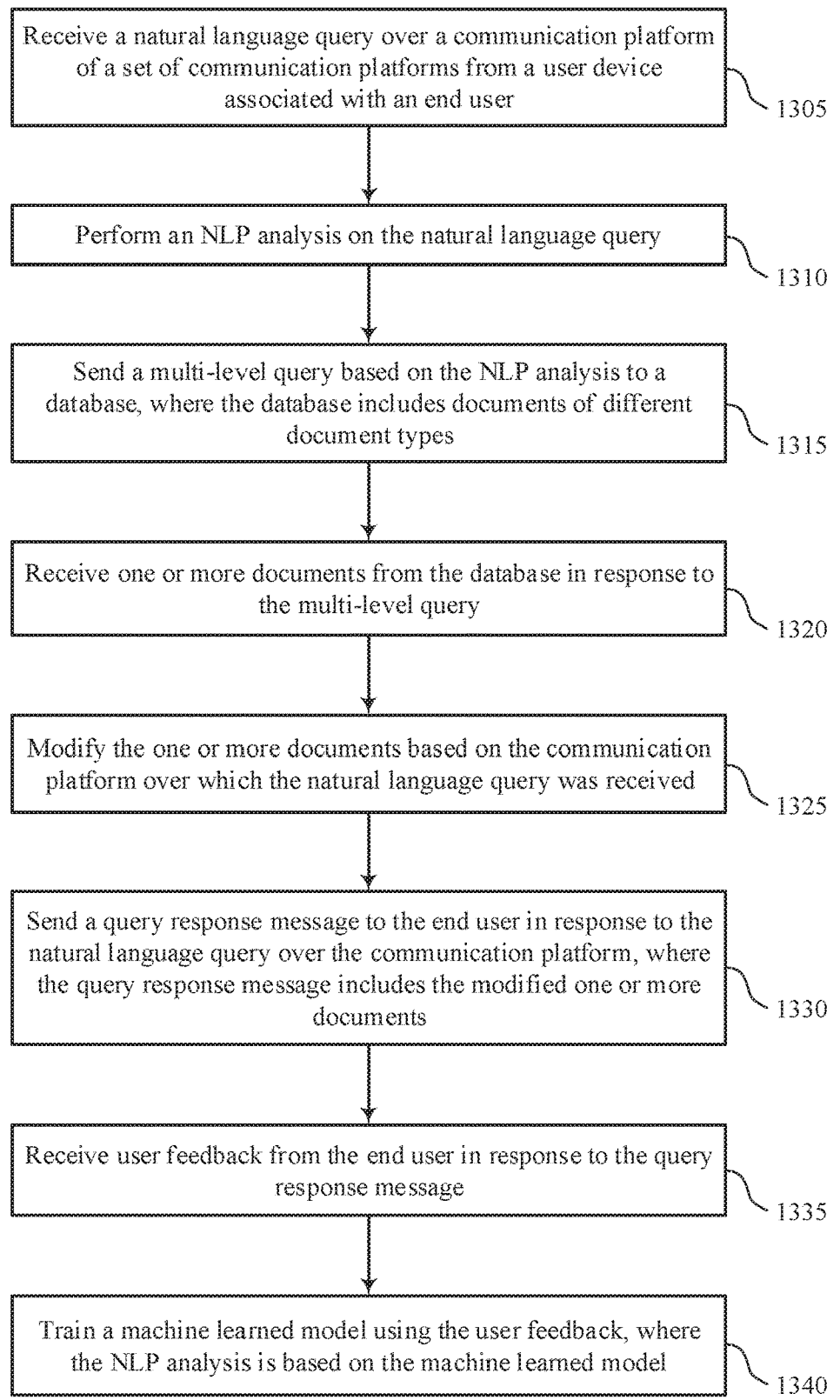

FIG. 13 shows a flowchart illustrating a method 1300 for an omni-platform question answering system in accordance with aspects of the present disclosure. The operations of method 1300 may be implemented by a database server hosting an answer engine or its components as described herein. For example, the operations of method 1300 may be performed by a question answering module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1305 the database server may receive a natural language query over a communication platform of a plurality of communication platforms from a user device associated with an end user. The operations of 1305 may be performed according to the methods described herein. In certain examples, aspects of the operations of 1305 may be performed by a reception component as described with reference to FIGS. 7 through 9.

At 1310 the database server may perform an NLP analysis on the natural language query. The operations of 1310 may be performed according to the methods described herein. In certain examples, aspects of the operations of 1310 may be performed by an NLP component as described with reference to FIGS. 7 through 9.

At 1315 the database server may send a multi-level query based at least in part on the NLP analysis to a database, where the database contains documents of different document types. The operations of 1315 may be performed according to the methods described herein. In certain examples, aspects of the operations of 1315 may be performed by a multi-level query component as described with reference to FIGS. 7 through 9.

At 1320 the database server may receive one or more documents from the database in response to the multi-level query. The operations of 1320 may be performed according to the methods described herein. In certain examples, aspects of the operations of 1320 may be performed by a document retrieval component as described with reference to FIGS. 7 through 9.

At 1325 the database server may modify the one or more documents based at least in part on the communication platform over which the natural language query was received. The operations of 1325 may be performed according to the methods described herein. In certain examples, aspects of the operations of 1325 may be performed by a document modification component as described with reference to FIGS. 7 through 9.

At 1330 the database server may send a query response message to the end user in response to the natural language query over the communication platform, where the query response message includes the modified one or more documents. The operations of 1330 may be performed according to the methods described herein. In certain examples, aspects of the operations of 1330 may be performed by a query response component as described with reference to FIGS. 7 through 9.

At 1335 the database server may receive user feedback from the end user in response to the query response message. The operations of 1335 may be performed according to the methods described herein. In certain examples, aspects of the operations of 1335 may be performed by a user feedback component as described with reference to FIGS. 7 through 9.

At 1340 the database server may train a machine learned model using the user feedback, where the NLP analysis is based at least in part on the machine learned model. The operations of 1340 may be performed according to the methods described herein. In certain examples, aspects of the operations of 1340 may be performed by a user feedback component as described with reference to FIGS. 7 through 9.

A method of natural language query processing at a database server is described. The method may include receiving a natural language query over a communication platform of a plurality of communication platforms, performing an NLP analysis on the natural language query, and sending a multi-level query based at least in part on the NLP analysis to a database, wherein the database comprises documents of different document types. The method may further include receiving one or more documents from the database in response to the multi-level query, modifying the one or more documents based at least in part on the communication platform over which the natural language query was received, and sending a query response message in response to the natural language query over the communication platform, wherein the query response message comprises the modified one or more documents.

An apparatus for natural language query processing at a database server is described. The apparatus may include a processor, memory in electronic communication with the processor, and instructions stored in the memory. The instructions may be operable to cause the processor to receive a natural language query over a communication platform of a plurality of communication platforms, perform an NLP analysis on the natural language query, and send a multi-level query based at least in part on the NLP analysis to a database, wherein the database comprises documents of different document types. The instructions may be further operable to cause the processor to receive one or more documents from the database in response to the multi-level query, modify the one or more documents based at least in part on the communication platform over which the natural language query was received, and send a query response message in response to the natural language query over the communication platform, wherein the query response message comprises the modified one or more documents.

A non-transitory computer-readable medium for natural language query processing at a database server is described. The non-transitory computer-readable medium may include instructions operable to cause a processor to receive a natural language query over a communication platform of a plurality of communication platforms, perform an NLP analysis on the natural language query, and send a multi-level query based at least in part on the NLP analysis to a database, wherein the database comprises documents of different document types. The instructions may be further operable to cause the processor to receive one or more documents from the database in response to the multi-level query, modify the one or more documents based at least in part on the communication platform over which the natural language query was received, and send a query response message in response to the natural language query over the communication platform, wherein the query response message comprises the modified one or more documents.

Some examples of the method, apparatus, and non-transitory computer-readable medium described above may further include processes, features, means, or instructions for identifying an intent vector for the natural language query based at least in part on the NLP analysis. Some examples of the method, apparatus, and non-transitory computer-readable medium described above may further include processes, features, means, or instructions for determining the multi-level query based at least in part on the intent vector.

In some examples of the method, apparatus, and non-transitory computer-readable medium described above, the multi-level query comprises a plurality of sub-queries. Some examples of the method, apparatus, and non-transitory computer-readable medium described above may further include processes, features, means, or instructions for sending a first sub-query of the plurality of sub-queries to the database. Some examples of the method, apparatus, and non-transitory computer-readable medium described above may further include processes, features, means, or instructions for receiving a number of documents in response to the first sub-query that may be less than a threshold number of documents. Some examples of the method, apparatus, and non-transitory computer-readable medium described above may further include processes, features, means, or instructions for sending a second sub-query of the plurality of sub-queries based at least in part on the received number of documents being less than the threshold number of documents, wherein the second sub-query comprises fewer restrictions than the first sub-query.

Some examples of the method, apparatus, and non-transitory computer-readable medium described above may further include processes, features, means, or instructions for receiving a total set of documents from the database in response to the multi-level query, wherein the total set of documents comprises the one or more documents. Some examples of the method, apparatus, and non-transitory computer-readable medium described above may further include processes, features, means, or instructions for ranking the total set of documents using a machine learned model. Some examples of the method, apparatus, and non-transitory computer-readable medium described above may further include processes, features, means, or instructions for selecting the one or more documents from the total set of documents based at least in part on the ranking and a configured number of documents to return.

In some examples of the method, apparatus, and non-transitory computer-readable medium described above, the total set of documents comprises a first set of documents and a second set of documents, the first set of documents comprising posts associated with previous queries and the second set of documents comprising accessible articles. Some examples of the method, apparatus, and non-transitory computer-readable medium described above may further include processes, features, means, or instructions for ranking the first set of documents and the second set of documents separately.

In some examples of the method, apparatus, and non-transitory computer-readable medium described above, selecting the one or more documents from the total set of documents comprises combining a first subset of the first set of documents and a second subset of the second set of documents based at least in part on the ranking and the configured number of documents to return.

Some examples of the method, apparatus, and non-transitory computer-readable medium described above may further include processes, features, means, or instructions for performing a further NLP analysis on the one or more documents. Some examples of the method, apparatus, and non-transitory computer-readable medium described above may further include processes, features, means, or instructions for identifying a snippet from at least one of the one or more documents based at least in part on the further NLP analysis, wherein the query response message indicates the snippet.

In some examples of the method, apparatus, and non-transitory computer-readable medium described above, the natural language query may be received from a user device associated with an end user. In some examples of the method, apparatus, and non-transitory computer-readable medium described above, the query response message may be sent to the end user.

Some examples of the method, apparatus, and non-transitory computer-readable medium described above may further include processes, features, means, or instructions for sending an indication of the query response message to an intermediate user. Some examples of the method, apparatus, and non-transitory computer-readable medium described above may further include processes, features, means, or instructions for receiving a confirmation message from the intermediate user, wherein the query response message may be sent to the end user based at least in part on receiving the confirmation message from the intermediate user.

Some examples of the method, apparatus, and non-transitory computer-readable medium described above may further include processes, features, means, or instructions for receiving user feedback from the end user indicating a usefulness score of the query request message. Some examples of the method, apparatus, and non-transitory computer-readable medium described above may further include processes, features, means, or instructions for sending the user feedback, the query request message, the natural language query, or a combination of these to the database to be added to the documents.

Some examples of the method, apparatus, and non-transitory computer-readable medium described above may further include processes, features, means, or instructions for receiving user feedback from the end user in response to the query response message. Some examples of the method, apparatus, and non-transitory computer-readable medium described above may further include processes, features, means, or instructions for training a machine learned model using the user feedback, wherein a ranking procedure for the one or more documents may be based at least in part on the machine learned model.

In some examples of the method, apparatus, and non-transitory computer-readable medium described above, the different document types comprise posts associated with previous queries and accessible articles.

In some examples of the method, apparatus, and non-transitory computer-readable medium described above, the communication platform comprises an email, an SMS text message, a social media message, a web application, a native application, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for natural language query processing at a database server, comprising:
   receiving, from an end user, a natural language query over a communication platform of a plurality of communication platforms;
   generating a multi-level query based at least in part on the natural language query using a first machine learned model for natural language processing (NLP) analysis;
   sending the multi-level query to a database, wherein the database comprises documents of different document types;
   receiving one or more documents from the database in response to the multi-level query;
   ranking the one or more documents using a second machine learned model for document ranking;
   modifying the one or more documents based at least in part on the communication platform over which the natural language query was received;
   sending, to an intermediate user different from the end user and in response to the natural language query received from the end user, an indication of the modified one or more documents based at least in part on the ranking;
   receiving, from the intermediate user, a selection of one or more of the modified one or more documents;
   sending, to the end user, a query response message in response to the natural language query over the communication platform, wherein the query response message comprises the selected one or more of the modified one or more documents and is based at least in part on the ranking;
   updating both the first machine learned model for NLP analysis and the second machine learned model for document ranking based at least in part on the selection by the intermediate user; and
   bypassing the intermediate user for subsequent query response messages based at least in part on the first machine learned model for NLP analysis satisfying a first accuracy threshold and the second machine learned model for document ranking satisfying a second accuracy threshold.

2. The method of claim 1, further comprising:
   identifying an intent vector for the natural language query based at least in part on the first machine learned model for NLP analysis; and
   determining the multi-level query based at least in part on the intent vector.

3. The method of claim 1, wherein the multi-level query comprises a plurality of sub-queries, the method further comprising:
   sending a first sub-query of the plurality of sub-queries to the database;
   receiving a number of documents in response to the first sub-query that is less than a threshold number of documents; and
   sending a second sub-query of the plurality of sub-queries to the database based at least in part on the received number of documents being less than the threshold number of documents, wherein the second sub-query comprises fewer restrictions than the first sub-query.

4. The method of claim 1, further comprising:
   receiving a total set of documents from the database in response to the multi-level query, wherein the total set of documents comprises the one or more documents and wherein ranking the one or more documents using the second machine learned model for document ranking comprises ranking the total set of documents using the second machine learned model for document ranking; and
   selecting the one or more documents from the total set of documents based at least in part on the ranking the total set of documents and a configured number of documents to return.

5. The method of claim 4, wherein the total set of documents comprises a first set of documents and a second set of documents, the first set of documents comprising posts associated with previous queries and the second set of documents comprising accessible articles, the method further comprising:
   ranking the first set of documents and the second set of documents separately.

6. The method of claim 5, wherein selecting the one or more documents from the total set of documents comprises:
   combining a first subset of the first set of documents and a second subset of the second set of documents based at least in part on the ranking the first set of documents and the second set of documents separately and the configured number of documents to return, wherein the one or more documents comprises a number of documents equal to the configured number of documents to return.

7. The method of claim 1, further comprising:
   performing a further NLP analysis on the one or more documents; and
   identifying a snippet from at least one of the one or more documents based at least in part on the further NLP analysis, wherein the query response message indicates the snippet.

8. The method of claim 1, further comprising:
receiving a confirmation message from the intermediate user, wherein the query response message is sent to the end user based at least in part on receiving the confirmation message from the intermediate user.

9. The method of claim 1, further comprising:
receiving end user feedback from the end user indicating a usefulness score of the query response message;
sending the end user feedback, the query response message, the natural language query, or a combination of these to the database to be added to the documents; and
further updating the first machine learned model for NLP analysis, the second machine learned model for document ranking, or both based at least in part on the end user feedback.

10. The method of claim 1, wherein the different document types comprise posts associated with previous queries and accessible articles.

11. The method of claim 1, wherein the communication platform comprises an email, a short message service (SMS) text message, a social media message, a web application, a native application, or a combination thereof.

12. An apparatus for natural language query processing at a database server, comprising:
a processor;
memory in electronic communication with the processor; and
instructions stored in the memory and executable by the processor to cause the apparatus to:
receive, from an end user, a natural language query over a communication platform of a plurality of communication platforms;
generate a multi-level query based at least in part on the natural language query using a first machine learned model for natural language processing (NLP) analysis;
send the multi-level query to a database, wherein the database comprises documents of different document types;
receive one or more documents from the database in response to the multi-level query;
rank the one or more documents using a second machine learned model for document ranking;
modify the one or more documents based at least in part on the communication platform over which the natural language query was received;
send, to an intermediate user different from the end user and in response to the natural language query received from the end user, an indication of the modified one or more documents based at least in part on the ranking;
receive, from the intermediate user, a selection of one or more of the modified one or more documents;
send, to the end user, a query response message in response to the natural language query over the communication platform, wherein the query response message comprises the selected one or more of the modified one or more documents and is based at least in part on the ranking;
update both the first machine learned model for NLP analysis and the second machine learned model for document ranking based at least in part on the selection by the intermediate user; and
bypass the intermediate user for subsequent query response messages based at least in part on the first machine learned model for NLP analysis satisfying a first accuracy threshold and the second machine learned model for document ranking satisfying a second accuracy threshold.

13. The apparatus of claim 12, wherein the instructions are further executable by the processor to cause the apparatus to:
identify an intent vector for the natural language query based at least in part on the first machine learned model for NLP analysis; and
determine the multi-level query based at least in part on the intent vector.

14. The apparatus of claim 12, wherein the multi-level query comprises a plurality of sub-queries, the instructions further executable by the processor to cause the apparatus to:
send a first sub-query of the plurality of sub-queries to the database;
receive a number of documents in response to the first sub-query that is less than a threshold number of documents; and
send a second sub-query of the plurality of sub-queries to the database based at least in part on the received number of documents being less than the threshold number of documents, wherein the second sub-query comprises fewer restrictions than the first sub-query.

15. The apparatus of claim 12, wherein the instructions are further executable by the processor to cause the apparatus to:
receive a total set of documents from the database in response to the multi-level query, wherein the total set of documents comprises the one or more documents and wherein the instructions to rank the one or more documents using the second machine learned model for document ranking are further executable by the processor to cause the apparatus to rank the total set of documents using the second machine learned model for document ranking; and
select the one or more documents from the total set of documents based at least in part on the ranking the total set of documents and a configured number of documents to return.

16. A non-transitory computer-readable medium storing code for natural language query processing at a database server, the code comprising instructions executable by a processor to:
receive, from an end user, a natural language query over a communication platform of a plurality of communication platforms;
generate a multi-level query based at least in part on the natural language query using a first machine learned model for natural language processing (NLP) analysis;
send the multi-level query to a database, wherein the database comprises documents of different document types;
receive one or more documents from the database in response to the multi-level query;
rank the one or more documents using a second machine learned model for document ranking;
modify the one or more documents based at least in part on the communication platform over which the natural language query was received;
send, to an intermediate user different from the end user and in response to the natural language query received from the end user, an indication of the modified one or more documents based at least in part on the ranking;
receive, from the intermediate user, a selection of one or more of the modified one or more documents;
send, to the end user, a query response message in response to the natural language query over the communication platform, wherein the query response message comprises the selected one or more of the modified one or more documents and is based at least in part on the ranking;

update both the first machine learned model for NLP analysis and the second machine learned model for document ranking based at least in part on the selection by the intermediate user; and bypass the intermediate user for subsequent query response messages based at least in part on the first machine learned model for NLP analysis satisfying a first accuracy threshold and the second machine learned model for document ranking satisfying a second accuracy threshold.

17. The non-transitory computer-readable medium of claim 16, wherein the instructions are further executable by the processor to:

identify an intent vector for the natural language query based at least in part on the first machine learned model for NLP analysis; and determine the multi-level query based at least in part on the intent vector.

18. The non-transitory computer-readable medium of claim 16, wherein the multi-level query comprises a plurality of sub-queries, the instructions further executable by the processor to:

send a first sub-query of the plurality of sub-queries to the database;

receive a number of documents in response to the first sub-query that is less than a threshold number of documents; and send a second sub-query of the plurality of sub-queries to the database based at least in part on the received number of documents being less than the threshold number of documents, wherein the second sub-query comprises fewer restrictions than the first sub-query.

19. The method of claim 1, further comprising:

removing a document from the modified one or more documents based at least in part on the selection; and generating the query response message based at least in part on the removing.

20. The method of claim 9, further comprising:

receiving an additional natural language query;

generating an additional multi-level query based at least in part on the additional natural language query using the first machine learned model for NLP analysis, wherein the first machine learned model for NLP analysis is based at least in part on the updating the first machine learned model for NLP analysis based at least in part on the selection by the intermediate user, the further updating the first machine learned model for NLP analysis based at least in part on the end user feedback, or both;

sending the additional multi-level query to the database;

receiving one or more additional documents from the database in response to the additional multi-level query; and ranking the one or more additional documents using the second machine learned model for document ranking, wherein the second machine learned model for document ranking is based at least in part on the updating the second machine learned model for document ranking based at least in part on the selection by the intermediate user, the further updating the second machine learned model for document ranking based at least in part on the end user feedback, or both.

* * * * *